(12) United States Patent
Kishi

(10) Patent No.: US 9,311,339 B2
(45) Date of Patent: Apr. 12, 2016

(54) TERMINAL APPARATUS, INFORMATION PROCESSING SYSTEM, AND INFORMATION PROCESSING METHOD

(71) Applicant: Hidenobu Kishi, Kanagawa (JP)

(72) Inventor: Hidenobu Kishi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/323,331

(22) Filed: Jul. 3, 2014

(65) Prior Publication Data

US 2015/0016675 A1 Jan. 15, 2015

(30) Foreign Application Priority Data

Jul. 10, 2013 (JP) ................................. 2013-145020

(51) Int. Cl.
*G06K 9/00* (2006.01)
*G06F 17/30* (2006.01)
*G06Q 30/00* (2012.01)

(52) U.S. Cl.
CPC .......... *G06F 17/30256* (2013.01); *G06Q 30/00* (2013.01)

(58) Field of Classification Search
USPC ......................................................... 382/103
See application file for complete search history.

(56) References Cited

U.S. PATENT DOCUMENTS

| 2006/0227992 | A1* | 10/2006 | Rathus et al. ................. 382/100 |
| 2007/0106721 | A1* | 5/2007 | Schloter ....................... 709/200 |
| 2013/0057582 | A1* | 3/2013 | Aoki ............................. 345/633 |
| 2014/0172575 | A1* | 6/2014 | Boncyk et al. ............. 705/14.58 |
| 2014/0362235 | A1 | 12/2014 | Kishi et al. |

FOREIGN PATENT DOCUMENTS

| JP | 2010-140250 | 6/2010 |
| JP | 2014-010722 | 1/2014 |
| JP | 2014-182405 | 9/2014 |
| JP | 2014-238742 A | 12/2014 |

* cited by examiner

*Primary Examiner* — Yon Couso
(74) *Attorney, Agent, or Firm* — Oblon, McClelland, Maier & Neustadt, L.L.P.

(57) ABSTRACT

A terminal apparatus includes a first execution unit. The first execution unit includes an acquisition unit that acquires a captured image captured by an image capturing unit, a transmitting unit that transmits the captured image acquired by the acquisition unit to an image search system including a storage unit, in which objects and associated information associated with each other are stored, and an image search server that retrieves associated information associated with an object contained in the transmitted captured image and transmit the retrieved associated information to a transmission source of the captured image, a receiving unit that receives the associated information transmitted from the image search system based on the captured image transmitted from the transmitting unit, and a presenting unit that presents associated information corresponding to an externally-fed parameter, among the associated information received by the receiving unit.

13 Claims, 16 Drawing Sheets

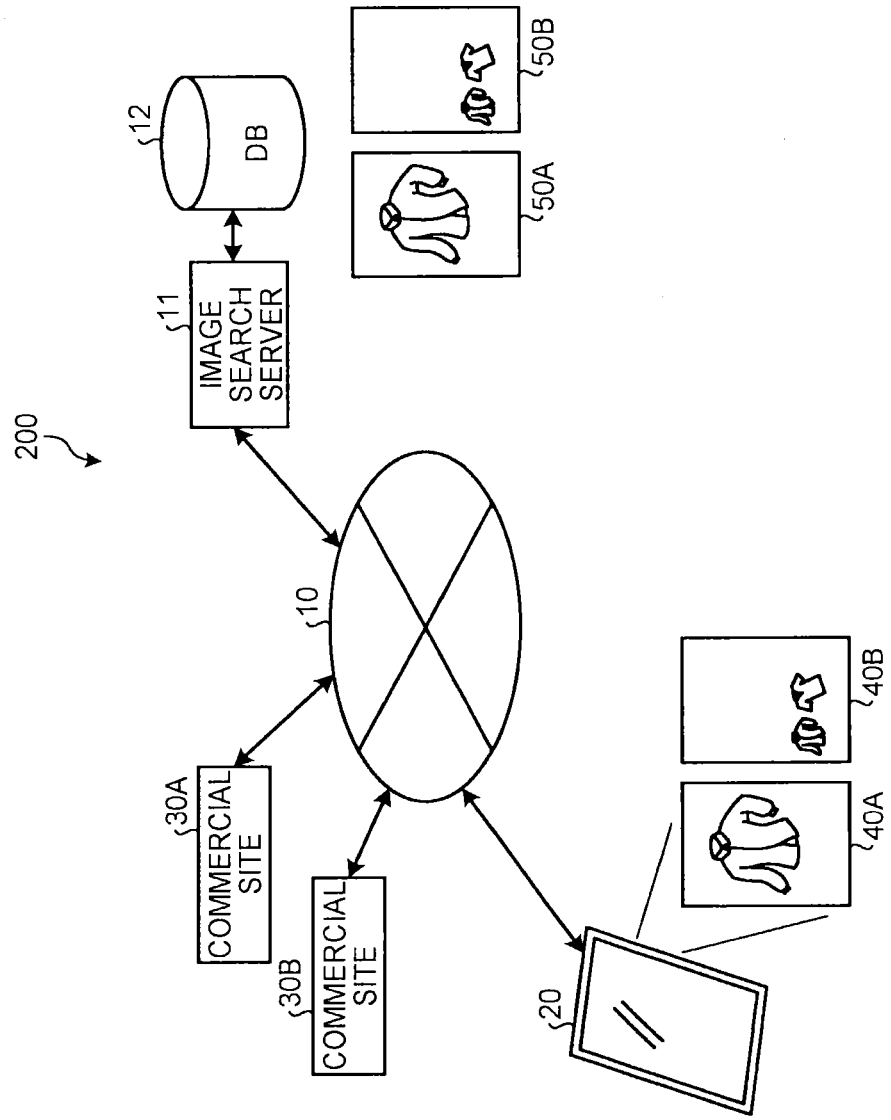

| ID | INDEX DATA |
|---|---|
| aaa001 | (BINARY DATA) |
| | |
| | |

(120)

| ID | TARGET REGION |
|---|---|
| aaa001 | (XML CODE/NAME OF XML FILE) |
| | |
| | |

(121)

TERMINAL APPARATUS, INFORMATION PROCESSING SYSTEM, AND INFORMATION PROCESSING METHOD

CROSS-REFERENCE TO RELATED APPLICATION(S)

The present application claims priority to and incorporates by reference the entire contents of Japanese Patent Application No. 2013-145020 filed in Japan on Jul. 10, 2013.

BACKGROUND OF THE INVENTION

1. Field of the Invention

The present invention relates to a terminal apparatus, an information processing system, and an information processing method that provides information over a network.

2. Description of the Related Art

Systems for providing electronic information related to a printed paper medium to a user viewing the printed paper medium are conventionally known. An example of such a system is disclosed in Japanese Laid-open Patent Application No. 2010-140250.

According to Japanese Laid-open Patent Application No. 2010-140250, a management server extracts features from original data of a printed paper medium using a feature extraction scheme appropriate for recognizing an image which includes text, prepares indexes based on the extracted features, and registers the indexes. More specifically, the management server performs a partial search process on a partial image, which is acquired by a user by capturing an image of the printed paper medium with a mobile camera phone or the like and then transmitted to the management server. The management server identifies a text or an article in the partial image, and transmits article information to the user's mobile camera phone.

According to Japanese Laid-open Patent Application No. 2010-140250, the management server can append a uniform resource locator (URL) of a related content to the article information to be transmitted to the user's mobile camera phone. Accordingly, the user can view not only the article information transmitted to the user's mobile camera phone but also the related content at the URL.

Meanwhile, application software (hereinafter, "image-capture-and-transmission application") into which an image capturing function and a function of transmitting a captured image to a management server are integrated can be installed in a mobile camera phone of a user. The image-capture-and-transmission application provides convenience to the user by eliminating the user's need to designate a URL of the management server and launch the captured-image transmitting function each time.

It is expected that, if the functions provided by the image-capture-and-transmission application are available from another application, the convenience will be further enhanced. For example, functionality of an event application for some event may be extended so that the event application can use the functions provided by the imago-capture-and-transmission application. This extension allows a user to acquire content specific to the event based on a captured image by utilizing the functions of the image-capture-and-transmission application available in the event application.

As described above, conventionally, to make the functions provided by the image-capture-and-transmission application available from the event application, a method of incorporating the functions provided by the image-capture-and-transmission application into the event application is typically used. This method allows a user to utilize the functions provided by the image-capture-and-transmission application without sacrificing usability or the like. Furthermore, because this method allows the user to utilize the functions provided by the image-capture-and-transmission application and the event application as a single application, the user can perform a series of operations smoothly.

However, the method described above is disadvantageous in that porting the functions provided by the image-capture-and-transmission application into the event application requires long-time development and much manpower, which lead to an increase in cost. Furthermore, because the development is from scratch, long time will disadvantageously be required from specification study to the actual development. More specifically, an increase in the time period from specification study to start of the development not only results in a great rise in cost but also makes it difficult to adapt to a quick need of a customer. For these reasons, development for causing functions of applications to collaborate or integrating them can lead to inefficiency and non-flexibility.

Under the circumstances, there is a need to make it possible to easily configure a function, which is provided by an application and utilized by a further application, depending on the purpose of the further application.

SUMMARY OF THE INVENTION

It is an object of the present invention to at least partially solve the problems in the conventional technology.

A terminal apparatus includes a first execution unit. The first execution unit includes an acquisition unit that acquires a captured image captured by an image capturing unit, a transmitting unit that transmits the captured image acquired by the acquisition unit to an image search system, the image search system including a storage unit, in which objects and associated information associated with each other are stored, and an image search server that retrieves associated information associated with an object contained in the transmitted captured image and transmit the retrieved associated information to a transmission source of the captured image, a receiving unit that receives the associated information transmitted from the image search system based on the captured image transmitted from the transmitting unit, and a presenting unit that presents associated information corresponding to an externally-fed parameter, among the associated information received by the receiving unit.

An information processing method includes: acquiring a captured image captured by an image capturing unit; transmitting the captured image acquired at the acquiring to an image search system, the image search system including a storage unit, in which objects and associated information associated with each other are stored, and an image search server that retrieves associated information associated with an object contained in a transmitted captured image and transmits the retrieved associated information to a transmission source of the captured image; receiving the associated information transmitted from the image search system based on the captured image transmitted at the transmitting; and presenting associated information corresponding to an externally-fed parameter, among the associated information received at the receiving.

An information processing system includes: a terminal apparatus; and an image search system including one or more information processing apparatuses, the terminal apparatus and the image search system being capable of carrying out communications with each other via a network. The terminal apparatus includes a first execution unit and a second execution unit. The first execution unit includes an acquisition unit that acquires a captured image captured by an image capturing unit, a first transmitting unit that transmits the captured image acquired by the acquisition unit to an image search system, the image search system including a storage unit, in which objects and associated information associated with each other are stored, and an image search server that retrieves associated information associated with an object contained in a transmitted captured image and transmits the associated information to a transmission source of the captured image, a first receiving unit that receives the associated information transmitted from the image search system based on the captured image transmitted from the first transmitting unit, and a presenting unit that presents associated information corresponding to an externally-fed parameter, among the associated information received by the first receiving unit. The second execution unit includes a processing unit that performs a predetermined function, and a first calling unit that calls the first execution unit while passing the parameter that is predetermined to the first execution unit. The image search system includes the storage unit, in which the objects and the associated information associated with each other are stored, a second receiving unit that receives the captured image, and a second transmitting unit that retrieves associated information associated with an object contained in a captured image based on the object and transmits the associated information to the transmission source of the captured image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an example configuration of a search system according to an embodiment;

DETAILED DESCRIPTION OF THE PREFERRED EMBODIMENTS

Figure 2A:
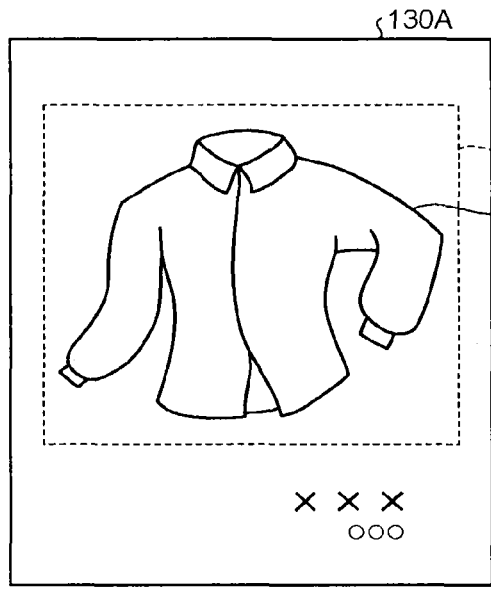
FIGS. 2A and 2B are diagrams illustrating an example of image data from which index data stored in a DB are generated according to the embodiment.

Exemplary embodiments of the present invention are described in detail below with reference to the accompanying drawings.

Prior to the description of the embodiments, description about an image search system applicable to the embodiments is presented to facilitate understanding. The image search system extracts an object from an image captured using an image capture device, compares the extracted object against objects stored in a database in advance, and determines which object, of the objects stored in the database, is most similar to the object extracted from the captured image. The image search system then presents link information to a commercial web site or the like associated in advance with the determined object to a user.

FIG. 1 is a diagram illustrating an example configuration of an image search system applicable to an embodiment of the present invention. In an image search system 200 shown in FIG. 1, an image search server 11 and a terminal apparatus 20 are connected to a network 10. The network 10 can be, for example, the Internet and use transmission control protocol/internet protocol (TCP/IP) as communication protocols. Alternatively, the network 10 can be a cloud network which is a network group including multiple network-connected computers and hidden from the outside except for inputs/outputs to/from the network group.

Multiple commercial web sites (hereinafter, "commercial sites") denoted by 30A and 30B are also connected to the network 10. The commercial sites 30A and 30B are capable of receiving purchase orders over the network 10 and dispatching commercial goods ordered.

The terminal apparatus 20 is capable of carrying out wired or wireless communications with the network 10. The terminal apparatus 20 is capable of performing operation in accordance with a command received over the network 10. Furthermore, the terminal apparatus 20, which includes a user interface (UI) including a display device and an input device, is capable of displaying an image received over the network 10 via the UI and transmitting data over the network 10 in accordance with user's manipulation of the UI.

The terminal apparatus 20 has an image-capturing function and is capable of capturing an image of a subject in accordance with an operation instructing to capture an image performed on the UI. The terminal apparatus 20 is capable of transmitting the captured image acquired by the image capture to the network 10.

The image search server 11, to which a database (DB) 12 is connected, is capable of performing a search process according to the embodiment in accordance with a request received over the network 10. In the embodiment, pieces of index data for use in search for image data 50A and image data 50B are stored in the DB 12 and associated with respective pieces of associated information. Each index data is data obtained by analyzing the image data in binary form and converting the image data into a structure for search.

Alternatively, the image data may be stored as it is in the DB 12. File names and paths of the image data may be stored in the DB 12.

The image search server 11 receives image data over the network 10, searches through the DB 12 based on the image data, and acquires associated information associated with the image data as a search result. The image search server 11 returns the associated information obtained as the search result to a transmission source of the image data.

Figure 2B:
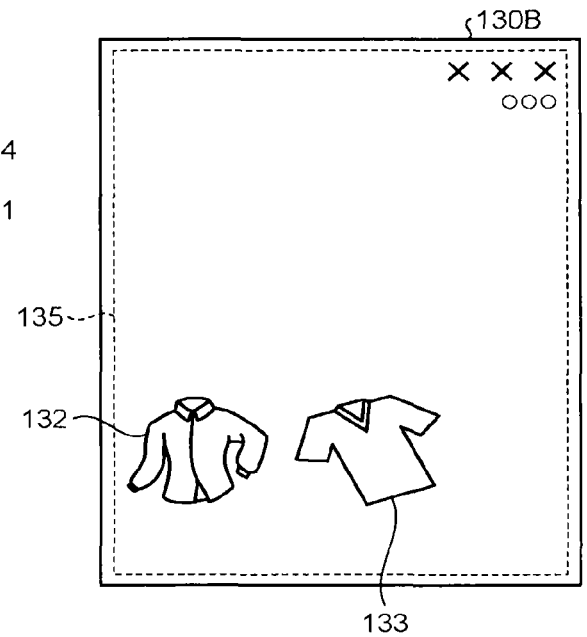

FIGS. 2A and 2B are diagrams illustrating an example of the image data 50A and 50B from which the index data stored in the DB 12 are generated. Objects contained in image data are defined in this document as follows: an object denotes an image of a main object in an image represented by image data not including a background image of the main object, information pertaining to the main object, and the like.

For example, assume that the image data 50A and image data 50B respectively represent a content page corresponding to content of a catalog magazine and a front cover page corresponding to a front cover of the catalog magazine. FIG. 2A illustrates an example of the image data 50A representing an image 130A of the content page. FIG. 2B illustrates an example of the image data 50B representing an image 130B of the front cover page.

FIG. 2A illustrates an example in which an object 131 is placed at a center of the image 130A. A target region 134, which encompasses the object 131, of the object 131 is defined in the image 130A. In the example illustrated in FIG. 2A, the ratio of the size of the object 131 to the size of the target region 134 is small. Objective of content pages of catalog magazines is to present commercial goods. Therefore, the object 131 is displayed large in the content page.

FIG. 2B illustrates an example in which multiple objects denoted by 132 and 133 are placed in the image 130B. In this example, the object 132 is a reduced image of the object 131 illustrated in FIG. 2A; the object 133 is another image. Other objects may be additionally placed in the image 130B. In the illustrated example, the objects 132 and 133 are displayed in the front cover page as thumbnail images, which are miniature version images, to show content of the catalog magazine in a summarized way. A target region 135 in the image 130B is configured to encompass the objects 132 and 133 and extend to the entire front cover page (i.e., the image 130B).

The target regions 134 and 135 are used as indicators for identifying the object 131, and the objects 132 and 133, respectively. Each target region can be of any size so long as the target region encompasses an entire object and is smaller than a size of an image which contains the object.

Associated information is described below. Associated information is, for example, information indicating a function associated with an object contained in an image. More specifically, the associated information includes information for access to attribute information of the object. Accordingly, in practice, the associated information can be considered as stored in the DB 12 as being associated with the object contained in the image.

For example, associated information of the object 131 contained in the image 130A representing the content page can be a uniform resource locator (URL) of the commercial site 30A where a commercial good represented by the object 131 is sold or a URL of a shopping web site at which an order for purchasing the commercial good can be issued. For another example, the associated information can be a telephone number or an electronic-mail (e-mail) address of a store selling the commercial good. For still another example, information for download of a data file containing data about the commercial good and the like can be used as the associated information. Meanwhile, multiple pieces of associated information can be associated with a single object in the DB 12.

For still another example, a URL of a web site for introducing the catalog magazine which includes the front cover page on the network 10 can be used as the associated information of the objects 132 and 133 contained in the image 130B representing the front cover page.

Figure 3:
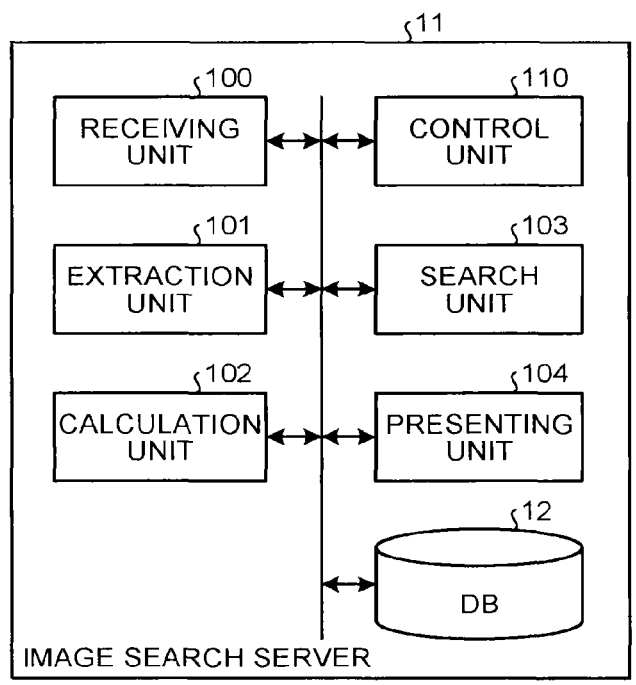
FIG. 3 is an exemplary functional block diagram illustrating functions of a server according to the embodiment.

FIG. 3 is an exemplary functional block diagram illustrating functions of the image search server 11. The image search server 11 includes a receiving unit 100, an extraction unit 101, a calculation unit 102, a search unit 103, a presenting unit 104, and a control unit 110. In FIG. 3, the DB 12 is depicted as being included in the image search server 11. The control unit 110 provides overall control of the image search server 11. The image search server 11 is configured to include one or more computers.

The receiving unit 100 receives data transmitted over the network 10. For example, the receiving unit 100 receives a captured image (hereinafter, the "captured image 40A") transmitted from the terminal apparatus 20.

The extraction unit 101 extracts an object contained in the captured image 40A received by the receiving unit 100 by performing image analysis on the captured image 40A and detecting feature points of the captured image 40A. For example, the extraction unit 101 detects feature points of the captured image 40A by binarizing the captured image 40A and performing edge detection and normalization on the binarized captured image 40A. The object is represented by the detected feature points.

The calculation unit 102 compares the feature points of the captured image 40A extracted by the extraction unit 101 with feature points representing each of the objects retrieved with indexes stored in the DB 12. The calculation unit 102 calculates, based on a result of the comparison, similarity between the object contained in the captured image 40A and each of the objects retrieved with the indexes stored in the DB 12. The similarity can be calculated by comparing relationship between the feature points extracted from the image for each of the images. For example, similarity can be evaluated as follows. Feature values are calculated by expressing relationship of feature points into a numerical form. An absolute value of a difference between the feature values is calculated for each pair of images. If the absolute value of the difference between images is smaller, the similarity is determined as higher.

The search unit 103 searches through the objects retrieved with the indexes stored in the DB 12 for an image with high similarity with the object contained in the captured image 40A, based on the similarity calculated by the calculation unit 102. As a result of the search, the search unit 103 outputs a single index containing the object with the highest similarity with the object contained in the captured image 40A among the objects retrieved with the indexes stored in the DB 12.

Alternatively, the search unit 103 may output a predetermined number of indexes in an order from one including objects with the highest similarity with the object contained in the captured image 40A among the objects, as a search result. Further alternatively, the search unit 103 may output one or more indexes with which the objects with similarity equal to or higher than a threshold value are retrieved, as a search result. Further alternatively, the search unit 103 may output every index with similarity within a predetermined margin (of, e.g., 5%) from a maximum similarity calculated from the captured image 40A as a search result.

The presenting unit 104 retrieves associated information associated with the index, which is the search result output from the search unit 103, from the DB 12 and presents (transmits) the associated information to the terminal apparatus 20. Accordingly, the presenting unit 104 has a function as a transmitting unit which transmits associated information to the terminal apparatus 20. This presentation of the associated information may be performed by directly transmitting the associated information to the terminal apparatus 20. Alternatively, the presentation may be performed by creating a web page containing the associated information and presenting information (e.g., the URL of the web page) for access to the web page to the terminal apparatus 20. The terminal apparatus 20 can acquire the associated information by accessing the web page.

Alternatively, the terminal apparatus 20 may acquire the associated information using application software (hereinafter, abbreviated as "application") installed into the terminal apparatus 20 in advance. The application is configured to perform a series of operations, starting from image capture of the captured image 40A and ending with displaying the presented associated information.

The image search server 11 can be embodied in a typical computer (information processing apparatus) including a central processing unit (CPU) and a storage, such as a random access memory (RAM), a read only memory (RAM), and a hard disk drive. The image search server 11 is not necessarily embodied in a single computer. Alternatively, the image search server 11 may be configured to operate in a distributed manner on multiple computers.

The receiving unit 100, the extraction unit 101, the calculation unit 102, the search unit 103, the presenting unit 104, and the control unit 110 described above are implemented by a search program running on the CPU. Alternatively, some or all of the receiving unit 100, the extraction unit 101, the calculation unit 102, the search unit 103, the presenting unit 104, and the control unit 110 may be implemented by discrete hardware components which operate in cooperation with each other. The search program for performing the search process according to the embodiment may be provided as being recorded in a non-transitory tangible computer-readable recording medium, such as a compact disk read only memory (CD-ROM) and a digital versatile disk (DVD), as a file in an installable format or an executable format.

The search program for performing the search process according to the embodiment may be configured to be stored in a computer connected to a communication network such as the Internet and provided by downloading over the communication network. The search program for performing the search process according to the embodiment may be configured to be provided or distributed over a communication network such as the Internet.

The search program for performing the search process according to the embodiment is configured in modules including, for example, the units described above (the receiving unit 100, the extraction unit 101, the calculation unit 102, the search unit 103, the presenting unit 104, and the control unit 110). From the viewpoint of actual hardware, for example, the CPU reads out the search program from the storage medium and executes the search program to load the units onto the main storage device (e.g., the RAM), thereby generating the units on the main storage device.

The terminal apparatus 20 configured as descried above may be used in the following manner, for example. A user obtains the captured image 40A and a captured image 40B by capturing images of pages of a catalog magazine using the terminal apparatus 20. In this example, it is assumed that the captured images 40A and 40B are an image obtained by capturing a content page of the catalog magazine and an image obtained by capturing a front cover page of the same, respectively. The user may transmit the captured image 40A, for example, to the image search server 11 over the network 10.

The captured image 40A is received by the receiving unit 100 of the image search server 11. The extraction unit 101 detects feature points of the received captured image 40A and extracts an object. The calculation unit 102 calculates, based on the feature points detected by the extraction unit 101, similarity between the object contained in the captured image 40A and each of the objects retrieved with the indexes stored in the DB 12. The search unit 103 searches for and retrieves an index based on a result of the calculation and outputs the index as a search result. The presenting unit 104 retrieves associated information from the DB 12 based on the search result output from the search unit 103 and presents the associated information to the terminal apparatus 20, which is the transmission source of the captured image 40A.

The user can access the commercial site 30A, for example, based on the associated information presented to the terminal apparatus 20 by the image search server 11 and purchase a commercial good indicated by the object contained in the captured image 40A.

Assume that, for example, an image containing an object closely similar to the object 131 contained in the image 130A illustrated in FIG. 2A is captured as the captured image 40A using the terminal apparatus 20. Further assume that the image 130A containing the object 131 and the image 130B containing the object 132, which is the reduced version of the object 131, are stored in the DB 12.

In this scenario, it is possible that the image 130B, rather than the image 130A, is undesirably retrieved as a result of search performed based on similarity calculated from feature points detected from the captured image 40A. In this case, a user cannot acquire desired associated information. To prevent such an undesirable situation, according to the embodiment, the search unit 103 performs search through images stored in the DB 12 based on a ratio between a size of a target region (image capture range) and a size of an object.

This is described more specifically below with reference to FIGS. 2A and 2B. In the image 130A illustrated in FIG. 2A, the object 131 is placed to take up large space relative to the image 130A; the target region 134 is set such that the size of the target region 134 is slightly larger than the size of the object 131. By contrast, in the image 130B illustrated in FIG. 2B, the object 132, which is the reduced version of the object 131, is placed; the target region 135 is considerably large relative to the whole area of the image 130B or, in other words, the size of the target region 135 is sufficiently larger than the size of the object 132.

Assume that a first ratio, which is the ratio of the size of the object 131 to the size of the target region 134 of the image 130A calculated from their areas, is 1:2, for example. On the other hand, a second ratio, which is the ratio of the size of the object 132 to the size of the target region 135 of the image 130B calculated from their areas, is 1:16, for example. Thus, the second ratio differs considerably from the first ratio. It is noted that the method for calculating the ratio of the sizes is not limited to the area-based method. Such information indicating the ratios of the sizes may be calculated in advance and stored in the DB 12 as being contained in the indexes.

As for the captured image 40A received from the terminal apparatus 20, it is conceivable to calculate a ratio of the size of the object extracted by the extraction unit 101 to the size of the captured image 40A. Assume that the captured image 40A is, for example, such an image as the image 130A illustrated in FIG. 2A, and a third ratio, which is the ratio of the size of an object (in this example, the object 131) to the size of the captured image 40A, is 1:4.

In this case, the third ratio is closer to the first ratio than to the second ratio. Therefore, the search unit 103 outputs an index corresponding to the image 130A as a result of the search performed based on the captured image 40A. The presenting unit 104 presents the associated information associated with the index corresponding to the image 130A to the terminal apparatus 20. Selecting an index based on the ratio of the size of the object to the image size in this manner allows more reliable selection of a desired index.

Figures 4A, 4B, 5:
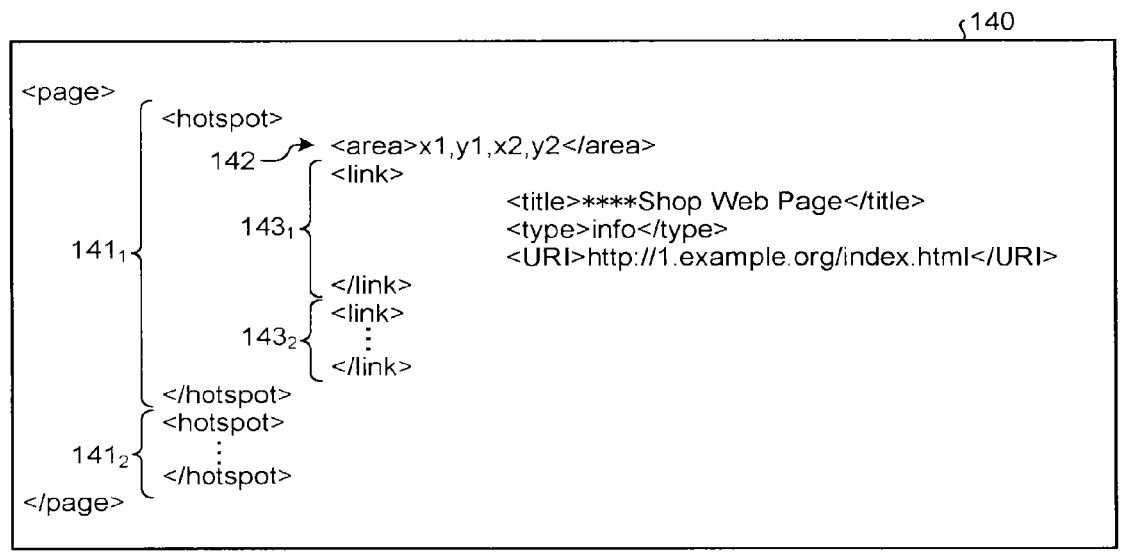
FIGS. 4A and 4B are diagrams illustrating an example configuration of the DB according to the embodiment.
FIG. 5 is a diagram illustrating an example of an XML code according to the embodiment.

FIGS. 4A and 4B illustrate an example configuration of the DB 12 for implementing image search based on the ratio of the object size. FIG. 4A illustrates an example of an index table 120 for identifying respective pieces of index data stored in the DB 12. As illustrated in FIG. 4A, the pieces of index data are stored in the DB 12 such that each piece of index data in a binary form is associated with an identification (ID).

The IDs can be of any format so long as the IDs allow identification of the respective pieces of index data stored in the DB 12. In a case where the pieces of index data stored in the DB 12 are for retrieving respective objects on pages of a catalog magazine, a value containing a page number of a page where the object is contained can be used as the ID.

FIG. 4B illustrates an example of a target region table 121 which associates the IDs of the images with target regions. In this example, the target region is described using extensible markup language (XML), one of markup languages which define and describe functions and structures of data by using tags. Description of associated information is also embedded in the description of the target region. This will be described later. An XML code describing the target region may be directly stored in a field of the target region table 121. Alternatively, a scheme of storing the XML code in a file and storing the name of the file and a path to the file in the field can be employed.

FIG. 5 illustrates an example of an XML code 140 illustrated in FIG. 4B. The XML code 140 is an example XML code which describes target regions of a content page of the catalog magazine. An element enclosed in outermost tags "" and "" defines the page. Each of elements enclosed in tags "<hotspot>" and "</hotspot>" in parts $141_1$ and $141_2$ defines a single target region. Multiple target regions can be defined for a single page in this manner.

Referring to an element enclosed in tags <area>" and "</area>" of a first line 142 of the part $141_1$, a range of the target region is defined by, for example, upper left coordinates (x1, y1) and lower left coordinates (x2, y2).

Each of elements enclosed in tags "<link>" and "</link>" in parts $143_1$ and $143_2$ defines a single piece of associated information. Multiple pieces of associated information can be defined for a single target region in this manner. An element enclosed in tags "<title>" and "</title>" in the part $143_1$ defines a title of the associated information. An element enclosed in tags "<type>" and "</type>" defines a type of the associated information. In this example, address information on the network 10 is defined as the associated information by an element enclosed in tags "<URI>" and "</URI>".

The XML code 140 thus defines the target regions in the page and the associated information for the target regions. Accordingly, it is possible to perform a function defined by the associated information associated with the object contained in the target region in the page.

Figure 6:
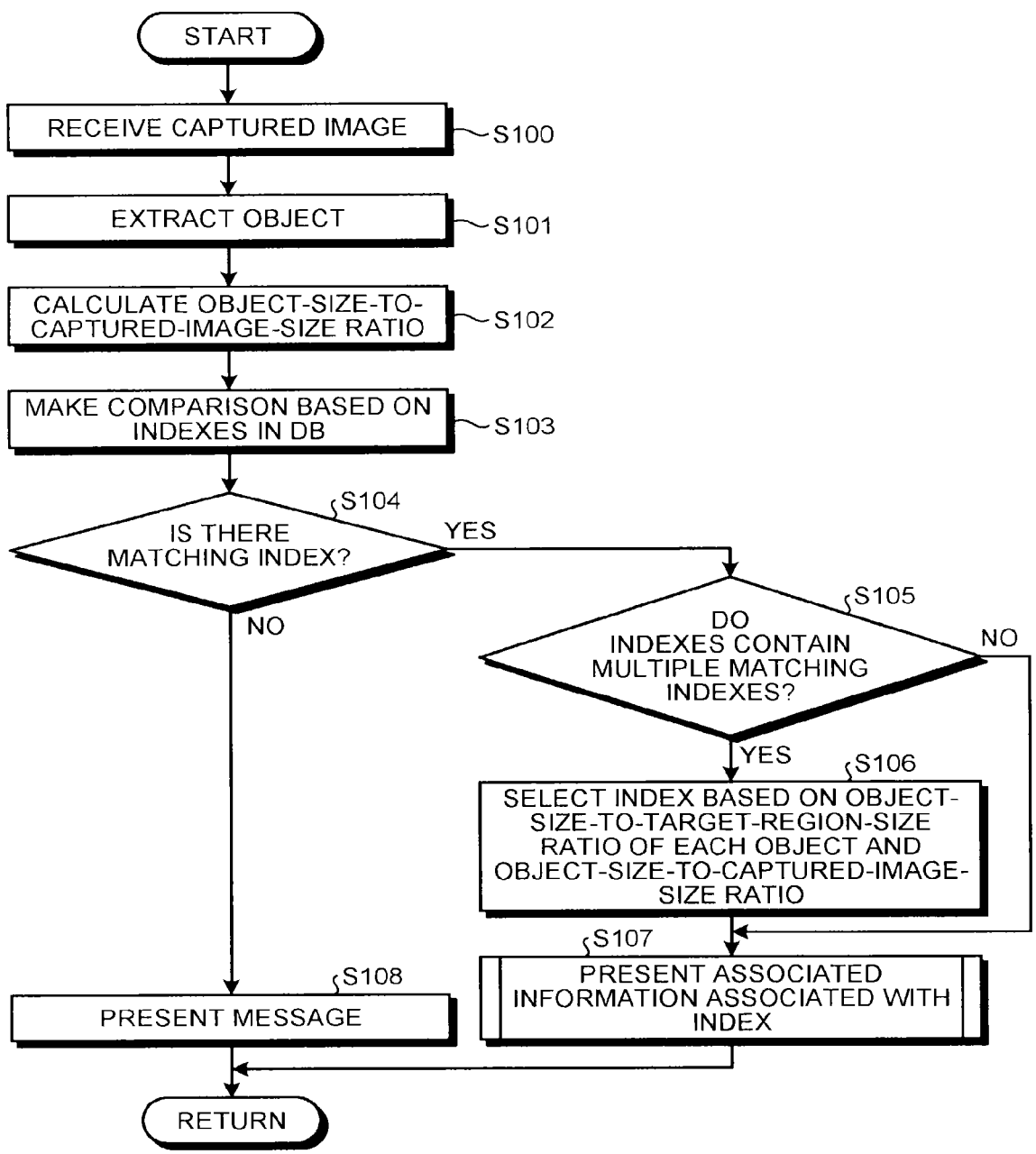
FIG. 6 is a flowchart illustrating an example of operations performed by the server according to the first embodiment.

FIG. 6 is a flowchart illustrating an example of operations performed by the image search server 11 according to the first embodiment. First, for example, the captured image 40A acquired by the terminal apparatus 20 by image capture is transmitted to the image search server 11 over the network 10. The receiving unit 100 of the image search server 11 receives the captured image 40A in Step S100. In Step S101, the extraction unit 101 extracts an object from the captured image 40A by performing image analysis on the received captured image 40A and detecting feature points.

The search unit 103 calculates the ratio of the size of the object to the size of the captured image 40A in Step S102. It is assumed that object-size-to-target-region-size ratios are calculated in advance for each image stored in the DB 12. Information indicating the ratio of the each image stored in the DB 12 can be embedded in the XML code 140 in advance.

In Step S103, the calculation unit 102 compares the object extracted from the captured image 40A against the objects retrieved with the indexes stored in the DB 12. More specifically, the calculation unit 102 calculates similarity between the object contained in the captured image 40A and each of the objects retrieved with the indexes stored in the DB 12.

In Step S104, the search unit 103 determines whether or not the indexes stored in the DB 12 contain an index with which an object matching the object contained in the captured object 40A is retrieved, based on the similarity calculated in Step S103. In this example, among the objects retrieved with the indexes stored in the DB 12, an object having a similarity equal to or higher than a threshold value is determined as the index with which the object matching the object contained in the captured image 40A is retrieved.

If it is determined in Step 104 that there is an index for which the objects match, the search unit 103 causes processing to proceed to Step S105. In Step S105, the search unit 103 determines whether or not the indexes stored in the DB 12 contain multiple indexes for which the objects match. If the search unit 103 determines that the indexes contain only a single index for which the objects match, the search unit 103 determines that the single index is a search result to be output and causes processing to proceed to Step S107. On the other hand, if the search unit 103 determines that the indexes contain multiple indexes for which the objects match, the search unit 103 causes processing to proceed to Step S106.

In Step S106, the search unit 103 calculates the object-size-to-target-region-size ratio of each of the multiple objects retrieved with the respective multiple indexes. These ratios of the multiple objects may be calculated and stored in the DB 12 in advance. The search unit 103 also calculates the ratio of the size of the object contained in the captured image 40A to the size of the captured image 40A. The search unit 103 determines which ratio among the ratios calculated from the respective multiple objects is closest to the ratio calculated from the captured image 40A, selects an index with which the object having the closest ratio is retrieved, as the search result to be output, and causes processing to proceed to Step S107.

In Step S107, the presenting unit 104 retrieves associated information associated with the index, which is the search result output from the search unit 103, from the DB 12. The presenting unit 104 then presents the retrieved associated information to the terminal apparatus 20, which is the transmission source of the captured image 40A. The series of operations according to the flowchart illustrated in FIG. 6 is then completed.

If the search unit 103 determines that the indexes contain no index for which the objects match, in Step S104, processing proceeds to Step S108. In Step S108, the presenting unit 104 presents, to the terminal apparatus 20, a message indicating that no index for which the objects match is stored in the DB 12. The series of operations indicated in the flowchart illustrated in FIG. 6 is then completed.

Figure 7:
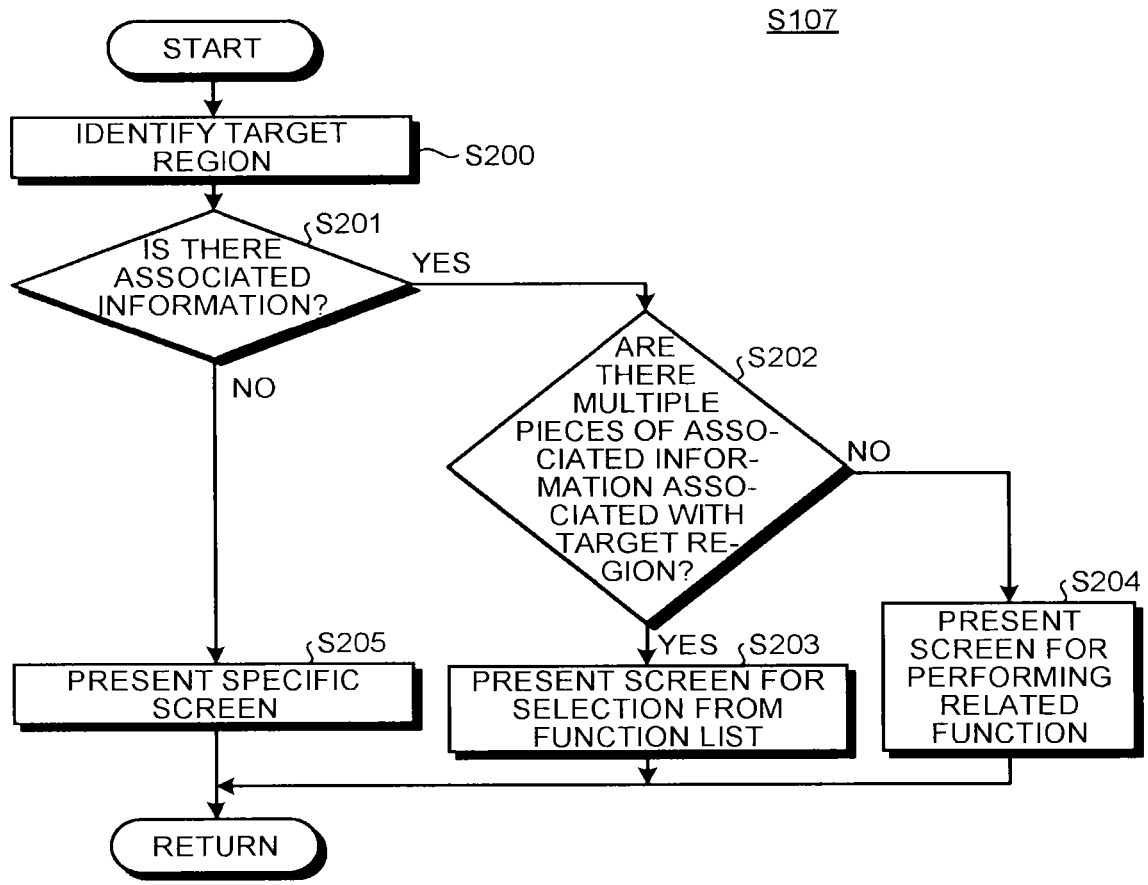
FIG. 7 is a flowchart illustrating an example of a process of presenting associated information associated with an index according to the embodiment.

FIG. 7 is a flowchart illustrating an example of the process to be performed in Step S107 of FIG. 6 of presenting the associated information associated with the index. First, in Step S200, the presenting unit 104 identifies the target region of the captured image 40A based on the index obtained as the search output by the search unit 103. In subsequent Step S201, the presenting unit 104 determines whether or not the DB 12 contains associated information associated with the identified target region. If the presenting unit 104 determines that the DB 12 contains associated information, the presenting unit 104 causes processing to proceed to Step S202, and determines whether or not multiple pieces of associated information are associated with the target region.

If the presenting unit 104 determines that multiple associated pieces of information are associated with the target region in Step S202, the presenting unit 104 causes processing to proceed to Step S203. In Step S203, the presenting unit 104 creates a function list of functions indicated by the multiple pieces of associated information, and presents a selection screen for selecting a single function from the function list to the terminal apparatus 20 For example, in a situation where URL and a telephone number are associated with the identified target region as pieces of associated information, the presenting unit 104 creates a selection screen for selecting either a function of accessing the URL address or a telephone function of calling the telephone number, and presents the selection screen to the terminal apparatus 20. The series of operations according to the flowchart illustrated in FIG. 7 is then completed.

If the presenting unit 104 determines that only a single piece of associated information is associated with the target region in Step S202, the presenting unit 104 causes processing to proceed to Step S204. In Step S204, the presenting unit 204 creates a screen for performing a function indicated by the single piece of associated information, and presents the screen to the terminal apparatus 20. The series of operations according to the flowchart illustrated in FIG. 7 is then completed.

If the presenting unit 104 determines that the DB 12 does not contain associated information associated with the target region identified in Step S201, the presenting unit 104 causes processing to proceed to Step S205. In Step S205, the presenting unit 104 presents a predetermined specific screen to the terminal apparatus 20. The series of operations according to the flowchart illustrated in FIG. 7 are then completed.

Although, in the example described above, the image search server 11 selects the single index from the multiple indexes in Step S106, it is not limited thereto. More specifically, a configuration in which a user is prompted to select a single index from multiple indexes may alternatively be employed.

Figure 8:
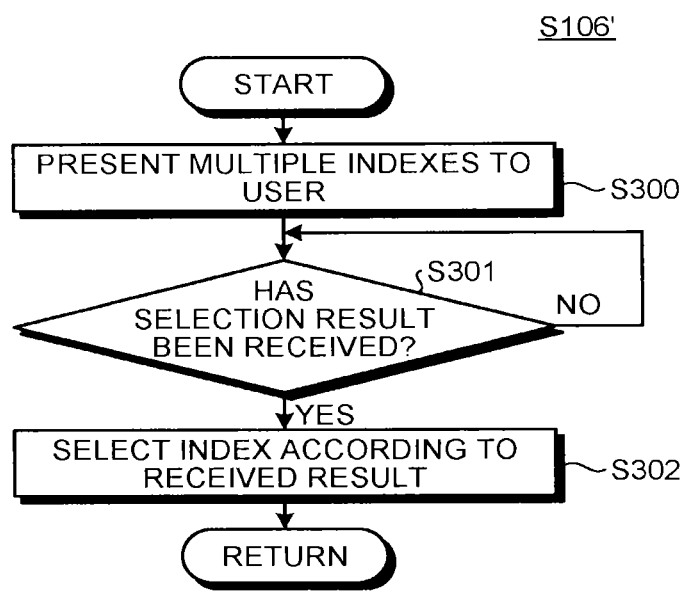
FIG. 8 is a flowchart illustrating an example of a process of prompting a user to select one of multiple indexes according to the embodiment.

FIG. 8 is a flowchart illustrating an example of the process which prompts a user to select a single index from the multiple indexes output by the search unit 103 as the search result. In this process, if the search unit 103 determines that the object contained in the captured image 40A matches in multiple indexes in Step S105 of FIG. 6 described above, the search unit 103 causes processing proceed to Step S106' illustrated in FIG. 8.

Step S106' is performed as follows: in Step S300, the presenting unit 104 creates a screen for presenting information indicating the multiple indexes for which matching is determined, to a user and presents the screen to the terminal apparatus 20. For example, the presenting unit 104 may create a screen where images of the objects retrieved with the multiple indexes are displayed and present the screen to the terminal apparatus 20.

The presenting unit 104 is on standby until receiving, from the terminal apparatus 20, a result of selection or, more specifically, a single index (object image) selected from the multiple indexes (object images) (Step S301). Upon receiving a notification that a single index is selected from the presented multiple indexes in Step S300 from the terminal apparatus 20, the presenting unit 104 selects one from the multiple object images of indexes for which matching is determined, according to the received result in Step S302. The presenting unit 104 retrieves associated information associated with the index with which the selected object is retrieved, from the DB 12 and presents the associated information to the terminal apparatus 20.

Presenting multiple images to a user in this manner also allows the user to select a desired image more reliably.

The terminal apparatus 20 configured as described above may be configured to display the respective information presented by the presenting unit 104 of the image search server 11 using a browser application for viewing web sites on the network 10. Furthermore, the terminal apparatus 20 may be configured to transmit requests and data to the image search server 11 using the browser application.

This end may be attained as follows, for example. The presenting unit 104 of the image search server 11 generates a file of display control data for presenting the respective information to the terminal apparatus 20 using, for example, hypertext markup language (HTML) or one of scripting languages of various types, and places the generated file at a predetermined address on the network 10. The presenting unit 104 sends the address to the terminal apparatus 20, so that the terminal apparatus 20 can access the display control data and display the respective information presented by the presenting unit 104 on the terminal apparatus 20.

If the series of image search operations, starting from transmission of a captured image from the terminal apparatus 20 and ending with display of presented information, can be comprehensively performed by a single piece of application software, great convenience will be provided to users. In the embodiment, the series of operations involved in the image search is to be executed by a single piece of application software, which is referred to as the "image search application".

First Embodiment

Figure 9:
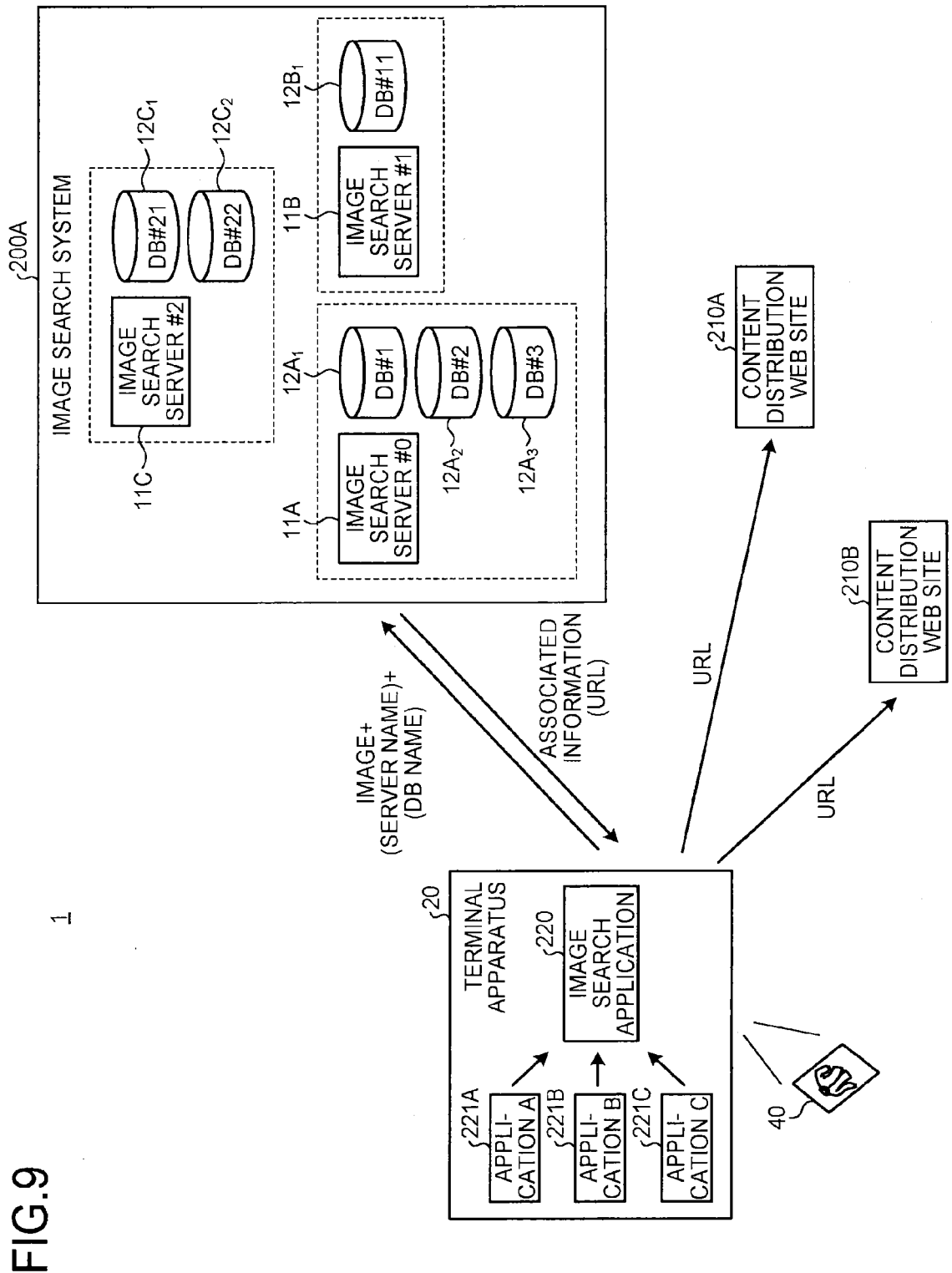
FIG. 9 is a diagram illustrating an example configuration of an information processing system according to a first embodiment.

An information processing system according to a first embodiment is described below. FIG. 9 is a diagram illustrating an example configuration of the information processing system according to the first embodiment. Referring to FIG. 9, an information processing system 1 includes an image search system 200A and the terminal apparatus 20 connected to each other over a network. The image search system 200A corresponds to the image search system 200 described above.

In this example, the image search system 200A includes multiple image search servers, which are image search servers 11A, 11B, and 11C, each of which includes one or more information processing apparatuses. Each of the image search servers 11A, 11B, and 11C includes one or more computers. Each of the image search servers 11A, 11B, and 11C can include one or more databases each corresponding to the DB 12. In the example illustrated in FIG. 9, the image search server 11A includes three databases denoted by $12A_1$, $12A_2$, and $12A_3$ each corresponding to the DB 12; the image search server 11B includes one database denoted by $12B_1$ corresponding to the DB 12; the image search server 11C includes two databases denoted by $12C_1$ and $12C_2$ each corresponding to the DB 12.

The terminal apparatus 20 can transmit the captured image 40 and designating information designating the image search server 11 and the DB 12 to the image search system 200A. The image search system 200A selects one of the image search servers 11 and one of the DBs 12 for use in image search based on the captured image 40 according to the designating information transmitted from the terminal apparatus 20.

In the image search system 200A, server names are assigned to the image search servers 11A, 11B, and 11C. In this example, the server names of the image search servers 11A, 11B, and 11C are "IMAGE SEARCH SERVER #0", "IMAGE SEARCH SERVER #1", and "IMAGE SEARCH SERVER #2". Similarly, in the image search system 200A, DB names are assigned to the DBs $12A_1$, $12A_2$, and $12A_3$, the DB $12B_1$, and the DBs $12C_1$ and $12C_2$. In this example, the DB names of the DBs $12A_1$, $12A_2$, and $12A_3$ are "DB#1", "DB#2", and "DB#3". The DB name of the DB $12B_1$ is "DB#11". The DB names of the DBs $12C_1$ and $12C_2$ are "DB#21" and "DB#22".

The terminal apparatus 20 transmits the captured image 40, to which a server name and a DB name are appended, to the image search system 200A. The image search system 200A determines an image search server, which is one of the image search servers 11A, 11B, and 11C, and a DB, which is one of the DBs $12A_1$, $12A_2$, and $12A_3$, the DB $12B_1$, and the DBs $12C_1$ and $12C_2$, for use in image search according to the server name and the DB name appended to the received captured image 40.

Hereinafter, any one of the image search servers 11A, 11B, and 11C is referred to as the "image search server 11" in a situation where differentiating between them is not required. Similarly, any one of the DBs $12A_1$, $12A_2$, and $12A_3$, the DB $12B_1$, and the DBs $12C_1$ and $12C_2$ is referred to as the "DB 12" in a situation where differentiating between them is not required.

The terminal apparatus 20 includes an image search application 220 described above and one or more specific applications. The specific applications each utilize the function provided by the image search application 220. In the example illustrated in FIG. 9, three applications denoted by 221A, 221B, and 221C are the specific applications. In the first embodiment, the image search application 220 is launched by being called by the specific application and used thereby. As a matter of course, the terminal apparatus 20 may include only a single specific application which calls the image search application 220, or may include multiple different specific applications as in FIG. 9 where the terminal apparatus 20 includes the specific applications 221A, 221B, and 221C. The terminal apparatus 20 can be launched and used independently.

In the description below, unless otherwise specified, the specific application is described as the representative of the multiple applications 221A, 221B, and 221C.

The specific application can pass a parameter to the image search application 220 when the specific application calls the image search application 220. The parameter contains information indicating the calling source and can include other value(s). Such a parameter can be described using a URL scheme structure. The URL scheme includes a scheme name and predetermined information described in a form determined on a per-scheme basis. The scheme name and the predetermined information are separated by a colon ":". For example, information indicating a calling source (e.g., application name) may be described in a scheme name part, which is followed by a colon. Following the colon, other values (a variable, a command, and the like) may be described.

The image search application 220 can change behavior thereof according to the parameter passed from the specific application. For example, the image search application 220 can change displayed appearance (referred to as "skin") and UI of the terminal apparatus 20 where the image search application 220 runs according to the parameter passed from the specific application.

For another example, the specific application can configure the parameter so as to contain the server name and the DB name described above and pass the parameter to the image search application 220. In this case, the image search application 220 appends the server name and the DB name contained in the parameter passed from the specific application to the captured image 40 and transmits the captured image 40 to the image search system 200A. Accordingly, the image search system 200A can perform image searches based on the same captured image 40 using a different combination of the image search server 11 and the DB 12 and return different associated information to the terminal apparatus 20 as results of the searches performed based on the same captured image 40.

For example, assume a situation in which the image search application 220 is called by the specific application with a parameter A containing the server name "IMAGE SEARCH SERVER #0" and the DB name "DB#1" passed from the specific application. In this case, the image search application 220 transmits the captured image 40, to which the server name "IMAGE SEARCH SERVER #0" and the DB name "DB#1" are appended, to the image search system 200A. The image search system 200A causes the image search server 11A to perform image search using the DB $12A_1$ according to the server name and the DB name appended to the captured image 40, and transmits associated information obtained as a search result to the terminal apparatus 20. The associated information may indicate, for example, a URL of a content distribution web site 210A.

For another example, assume a situation in which the image search application 220 is called by the application 221B with a parameter B containing the server name "IMAGE SEARCH SERVER #1" and the DB name "DB#11" passed from the application 221B. In this case, the image search application 220 transmits the captured image 40, to which the server name "IMAGE SEARCH SERVER #1" and the DB name "DB#11" are appended, to the image search system 200A. The image search system 200A causes the image search server 11B to perform image search using the DB $12B_1$ according to the server name and the DB name appended to the captured image 40, and transmits associated information obtained as a search result to the terminal apparatus 20. The associated information may indicate, for example, a URL of a content distribution web site 210B.

Figure 10:
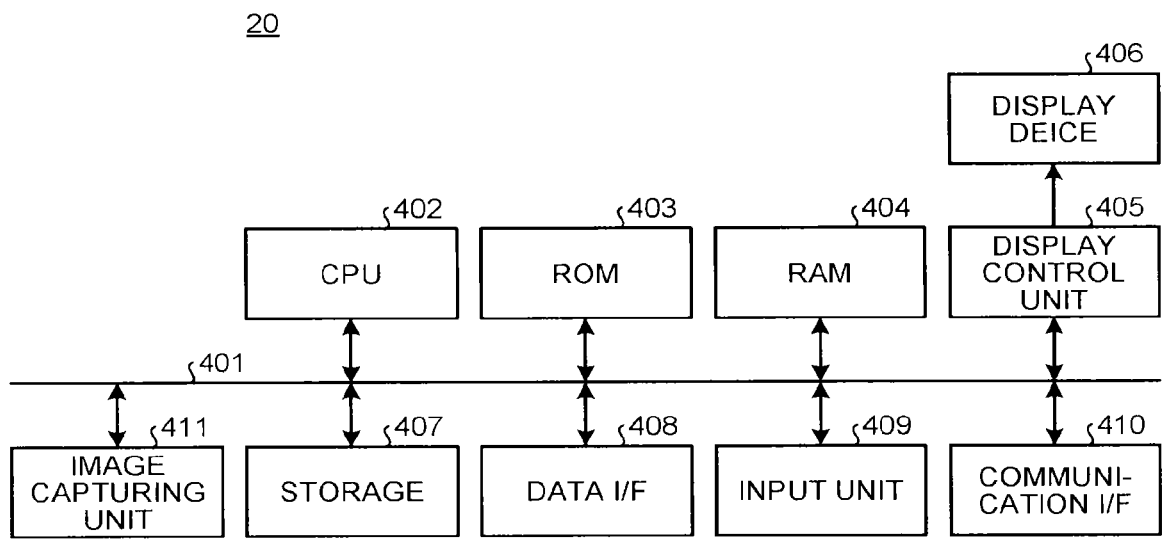
FIG. 10 is a block diagram illustrating an example configuration of a terminal apparatus according to the first embodiment.

FIG. 10 illustrates an example configuration of the terminal apparatus 20 according to the first embodiment. The terminal apparatus 20 illustrated in FIG. 10 includes a CPU 402, a ROM 403, a RAM 404, and a display control unit 405 which are connected to a bus 401. The terminal apparatus 20 further includes a storage 407, a data interface (I/F) 408, an input unit 409, a communication I/F 410, and an image capturing unit 411 which are connected to the bus 401. The storage 407 is a storage medium capable of non-volatile storing data and can be, for example, a non-volatile semiconductor memory such as a flash memory. Alternatively, the storage 407 can be a hard disk drive.

The CPU 402 provides overall control of operations of the terminal apparatus 20 according to programs stored in the ROM 403 and the storage 407 by using the RAM 404 as a working memory. The display control unit 405 converts a display control signal generated by the CPU 402 into a signal displayable by a display device 406 and outputs the converted signal.

The storage 407 stores the programs to be executed by the CPU 402 and various types of data. The data I/F 408 allows external data inputs. As the data I/F 408, an interface such as a universal serial bus (USB) interface or an Institute of Electrical and Electronics Engineers (IEEE) 1394 interface can be used.

The input unit 409 includes an input device which receives user's input and outputs a predetermined control signal. A user can issue a command to the terminal apparatus 20 by operating the input device in accordance with a display on the display device 406, for example. It is preferable to configure the input device for receiving user's input in one piece with the display device 406 as a touchscreen which outputs a control signal depending on a touched position and makes it possible to see an image displayed on the display device 406 through the touchscreen.

The communication I/F 410 carries out data communications with the network 10 using a predetermined protocol. The image capturing unit 411 includes an optical system, an imaging device, and a control drive circuit for the optical system and the imaging device, and outputs image data, which is obtained by performing predetermined processing on a signal output from the imaging device. The image capturing unit 411 performs a function, such as image capturing or zooming, in accordance with a command caused to be issued by a user by operating the input unit 409. The captured image acquired by the image capturing unit 411 by image capture is transmitted to the communication I/F 410 via the bus 401, and transmitted to the image search server 11 over the network 10 in accordance with a command from the CPU 402, for example.

Figure 11:
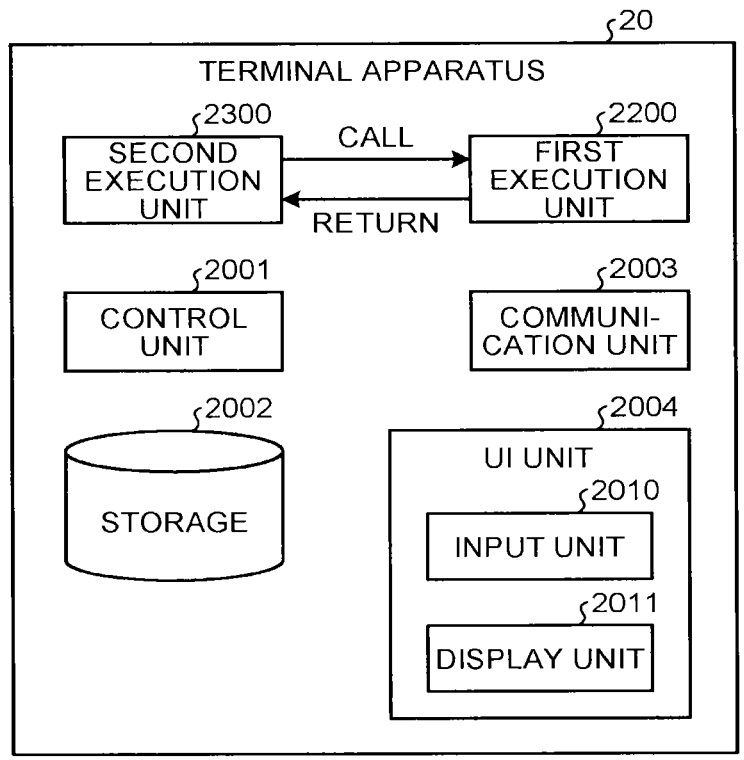
FIG. 11 is an exemplary functional block diagram for describing functions of the terminal apparatus according to the first embodiment.

FIG. 11 is an exemplary functional block diagram for describing functions of the terminal apparatus 20 according to the first embodiment. Referring to FIG. 11, the terminal apparatus 20 includes a control unit 2001, a storage 2002, a communication unit 2003, and a UI unit 2004. The terminal apparatus 20 further includes a first execution unit 2200 and a second execution unit 2300.

The first execution unit 2200 corresponds to the image search application 220. The second execution unit 2300 corresponds to the specific application. Accordingly, the first execution unit 2200 is launched by being called by the second execution unit 2300. Furthermore, when the first execution unit 2200 launched by being called by the second execution unit 2300 completes processing, the first execution unit 2200 gives processing (execution priority) back to the second execution unit 2300.

The control unit 2001 provides overall control of operations of the terminal apparatus 20. The storage 2002 corresponds to the storage 407 described above and stores programs to be executed on the terminal apparatus 20 and various types of data. The communication unit 2003 controls, for example, the communication I/F 410 to carry out external data communications over a network.

The UI unit 2004 includes an input unit 2010 and a display unit 2011. The input unit 2010 receives the control signal output from the input unit 409 illustrated in FIG. 10 by user's manipulation. The display unit 2011 generates display information for displaying an execution screen on the display device 406 illustrated in FIG. 10. The UI unit 2004 associates a position on the execution screen displayed on the display unit 2011 with a control signal, which is received by the input unit 2010, depending on a touched position where the input unit 409 is touched.

The control unit 2001, the communication unit 2003, and the UT unit 2004, and the first execution unit 2200 and the second execution unit 2300 described above are implemented by multiple programs which run on the CPU 402. Hereinafter, these multiple programs are collectively referred to as the "terminal program". The terminal program may be configured to be stored in a computer connected to the network 10 and provided by downloading over a network (not shown). The terminal program may be configured to be provided or distributed over the network. A part or the entire terminal program may be provided as being stored in the ROM 403 in advance.

The terminal program may alternatively be provided as being recorded in a non-transitory tangible computer-readable recording medium, such as a CD-ROM or a DVD, as a file in an installable format or an executable format. In this case, the terminal program recorded in the recording medium may be supplied to the terminal apparatus 20 via an external drive device connected to the data I/F 408, for example. Alternatively, the terminal program recorded in the recording medium may be temporarily stored in another information processing apparatus such as a personal computer and supplied from the information processing apparatus to the terminal apparatus 20 through communication via the communication I/F 410 or the data I/F 408.

The terminal program is configured in modules including the units described above (the control unit 2001, the communication unit 2003, and the UI unit 2004, and the first execution unit 2200 and the second execution unit 2300), for example. From the viewpoint of actual hardware, the CPU 402 reads out the terminal program from, for example, the storage 407 and executes the terminal program to load the units into a main storage device (e.g., the RAM 404), thereby generating the units on the main storage device.

Figure 12:
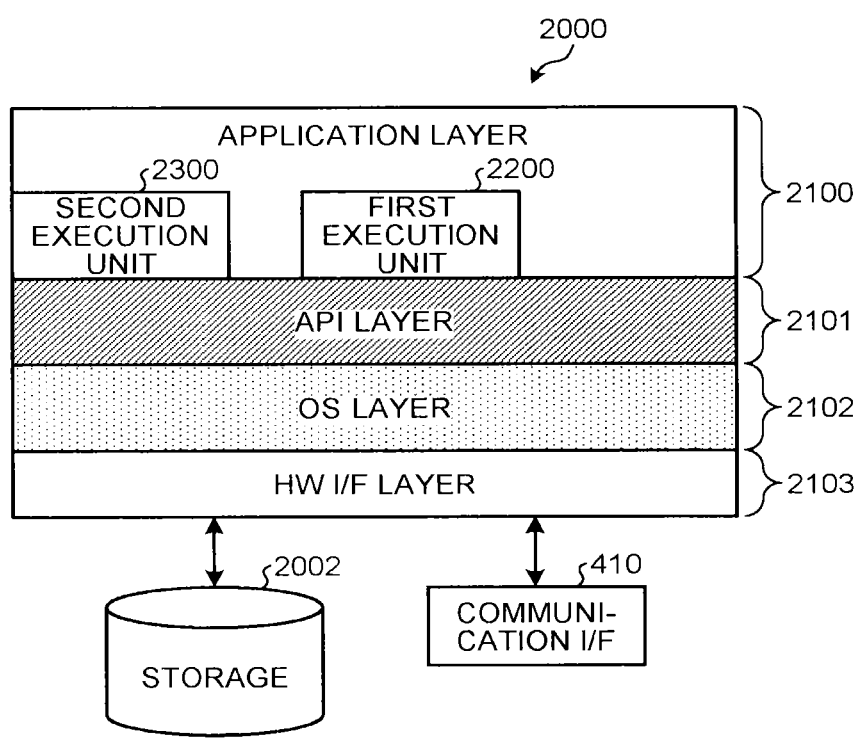
FIG. 12 is a diagram schematically illustrating an example configuration of a terminal program according to the first embodiment.

FIG. 12 schematically illustrates an example configuration of the terminal program on the terminal apparatus 20 according to the first embodiment. Referring to FIG. 12, a terminal program 2000 includes an application layer 2100, an API layer 2101, an operating system (OS) layer 2102, and a hardware I/F layer 2103. The application layer 2100 includes application software (hereinafter, abbreviated as "application"). The application directly provides a function of performing an operation, which is desired by a user of the terminal apparatus 20 to be performed on the terminal apparatus 20. In the example illustrated in FIG. 12, the application layer 2100 includes the first execution unit 2200 and the second execution unit 2300.

The API layer 2101 includes application programming interface (API) and intermediates between the application layer 2100 and the OS layer 2102 which is described later. The OS layer 2102 includes an OS and provides overall control of operations of the terminal program 2000. The OS includes various services which are common among and usable by the applications in the application layer 2100. For example, the control unit 2001, the communication unit 2003, and the UI unit 2004 are included in the OS layer 2102. The hardware I/F (HW I/F) layer 2103 intermediates between the OS layer 2102 and hardware such as the storage 2002 and the communication I/F 410.

Some applications, among the applications included in the application layer 2100, providing basic functions are pre-installed as standard applications in the terminal apparatus 20 in many cases. Examples of such a standard application include a browser application suitable for viewing various data on a network such as the Internet and an e-mail service application for transmitting and receiving e-mails.

The applications included in the application layer 2100 exchange data and commands with the OS layer 2102 via the API layer 2101. The applications utilize hardware facilities provided by the terminal apparatus 20 and exchange data and commands between the applications in this manner.

The first execution unit 2200 according to the first embodiment can be configured to be loaded into the main storage device by being called by the second execution unit 2300. A program for implementing the first execution unit 2200 is not necessarily initially included in the terminal apparatus 20; the program may be configured to be provided over a network or the like when the program is called by the second execution unit 2300.

A procedure according to the first embodiment for calling, by the second execution unit 2300, the first execution unit 2200 is schematically described below with reference to FIGS. 13A to 13C. Description below is based on an assumption that the second execution unit 2300 is launched and loaded into the main storage device, but the first execution unit 2200 is not launched yet. In other words, the application layer 2100 includes the second execution unit 2300 but does not include the first execution unit 2200. In this state, the second execution unit 2300 calls the first execution unit 2200.

Figure 13A:
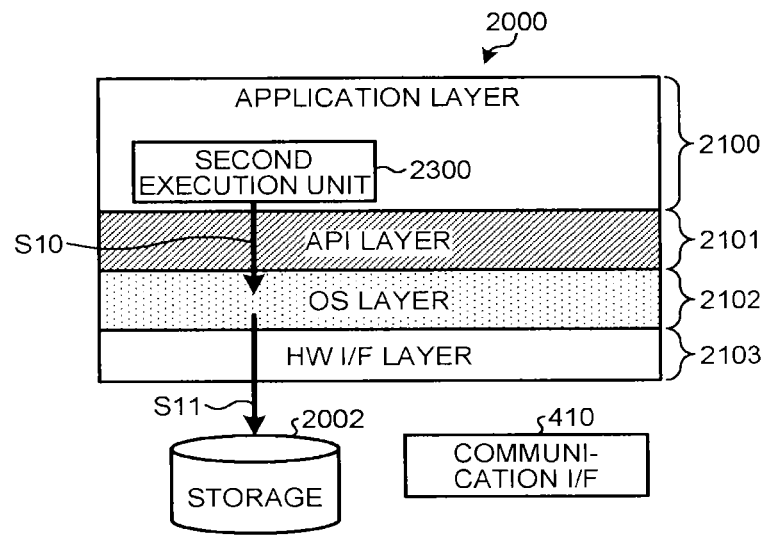
FIGS. 13A to 13C are diagrams schematically illustrating a procedure according to the first embodiment for calling, by a second execution unit, a first execution unit.

As illustrated in FIG. 13A, when a command to call the first execution unit 2200 is issued by user's manipulation, for example, the second execution unit 2300 requests the OS to launch the first execution unit 2200 (Step S10). In response to this request, the OS determines whether or not a program (referred to as the "first-execution-unit program") for executing the first execution unit 2200 has been installed in the terminal apparatus 20. In this example, the OS makes this determination based on whether or not the first-execution-unit program is stored in the storage 2002 (Step S11). Alternatively, the OS may make this determination based on a list, which is pre-stored in the RAM 404 or the like, of applications already installed into the terminal apparatus 20.

Figure 13B:
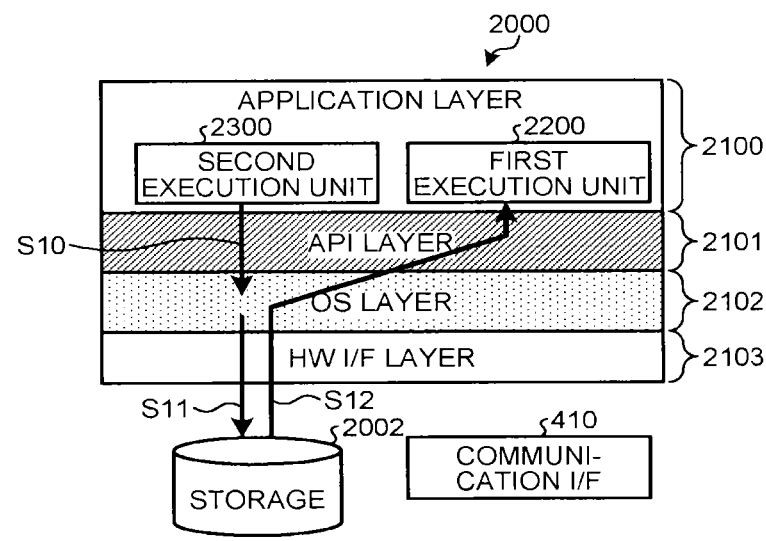

If the OS determines that the first-execution-unit program has been installed, as illustrated in FIG. 13B, the OS reads out the first-execution-unit program from, for example, the storage 2002 and loads it into the RAM 404, which is the main storage device (Step S12), and launches the first execution unit 2200. The OS takes application execution priority from the second execution unit 2300 and gives it to the first execution unit 2200, for example.

Figure 13C:
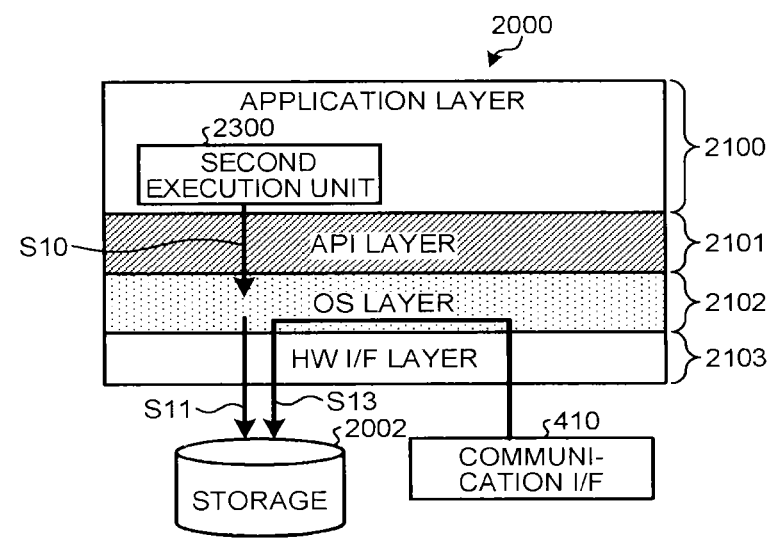

On the other hand, if the OS determines that the first-execution-unit program has not been installed into the terminal apparatus 20 yet, as illustrated in FIG. 13C, the OS controls the communication I/F 410 to externally acquire the first-execution-unit program over the network (Step S13). The acquired first-execution-unit program is temporarily stored in the storage 2002 and installed according to a predetermined procedure. When the first-execution-unit program has been installed, the OS launches the first-execution-unit program by performing the operation in Step S12 described above.

Figure 14:
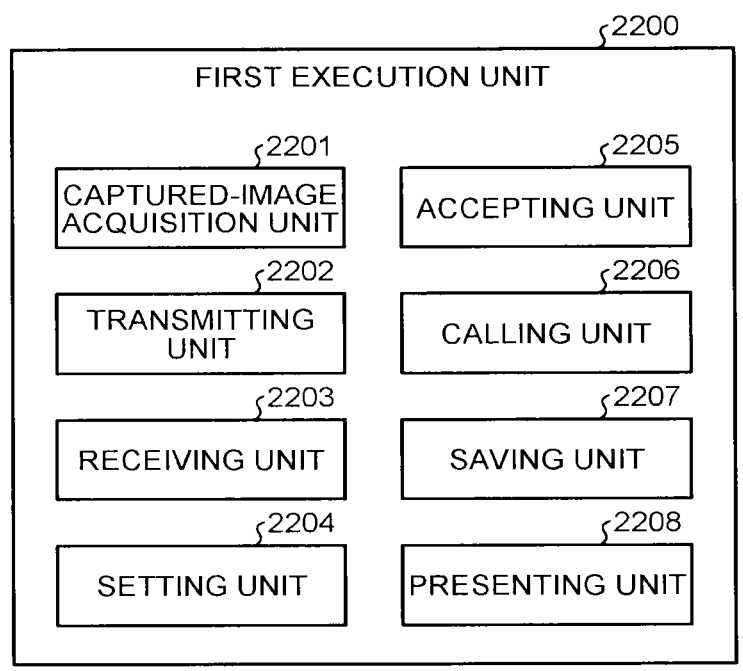
FIG. 14 is an exemplary functional block diagram for describing functions of the first execution unit according to the first embodiment.

FIG. 14 is an exemplary functional block diagram for describing functions of the first execution unit 2200 according to the first embodiment. Referring to FIG. 14, the first execution unit 2200 includes a captured-image acquisition unit 2201, a transmitting unit 2202, a receiving unit 2203, a setting unit 2204, an accepting unit 2205, a calling unit 2206, a saving unit 2207, and a presenting unit 2208.

The captured-image acquisition unit 2201 acquires a captured image by controlling image capture performed by the image capturing unit 411. The transmitting unit 2202 transmits information over the network. For example, the transmitting unit 2202 is provided with information about a network address of the image search system 200A in advance and transmits data to the image search system 200A over the network. The transmitting unit 2202 transmits the captured image acquired by the captured-image acquisition unit 2201 to the image search system 200A. The receiving unit 2203 receives information transmitted over the network. For example, the receiving unit 2203 receives associated information presented by the presenting unit 104 of the image search server 11 belonging to the image search system 200A.

The setting unit 2204 configures behavior of the first execution unit 2200 at runtime according to an externally-fed parameter. For example, the setting unit 2204 can configure displayed appearance (skin) of the launched first execution unit 2200 depending on the parameter. More specifically, for example, the setting unit 2204 may select one of several different skins, which are provided in advance, according to the parameter.

The skin is a set of data including image data, a rendering command, and layout data, for example. The first execution unit 2200 can be provided with multiple skin data sets in advance. Alternatively, the first execution unit 2200 can externally acquire skin data over the network, or acquire skin data from the second execution unit 2300 calling the first execution unit 2200.

The setting unit 2204 can configure UI of the first execution unit 2200 depending on the parameter. For example, the setting unit 2204 may configure components such as a button to be displayed on the UI or layout of the components according to the parameter. The first execution unit 2200 may be provided with multiple pieces of information for configuring the UI in advance. Each of the pieces of information can include information about which component is to be displayed on the UI and layout of the component. Alternatively, the first execution unit 2200 can externally acquire the information for configuring the UI over the network, or acquire the information from the second execution unit 2300 calling the first execution unit 2200.

The setting unit 2204 can configure the image search server 11 and the DB 12 for use in image search based on a designated parameter. For example, if the designated parameter contains a "server name" and a "DB name", the setting unit 2204 passes the "server name" and the "DB name" to the transmitting unit 2202. When transmitting the captured image 40 to the image search system 200A, the transmitting unit 2202 appends the "server name" and the "DB name" to the captured image 40.

The accepting unit 2205 accepts a parameter passed from the second execution unit 2300, for example. The accepting unit 2205 passes the accepted parameter to the setting unit 2204, for example. The calling unit 2206 calls the calling source of the first execution unit 2200. For example, at completion of the first execution unit 2200 launched by being called by the second execution unit 2300, the calling unit 2206 calls the second execution unit 2300.

The saving unit 2207 saves content data acquired based on a result of image search performed by the image search system 200A. When saving the content data, the saving unit 2207 can save and associate the content data with information indicating the calling source contained in the parameter passed from the second execution unit 2300. In addition or alternatively, the saving unit 2207 may save and associate the content data with information (e.g., URL) indicating a source from which the content data is acquired. Saving content data associated with a calling source and/or an acquisition source in this manner makes it possible to discriminate one content data set from another content data set and, accordingly, forming a collection of content data sets.

The presenting unit 2208 generates presenting information based on the associated information received by the receiving unit, and passes the presenting information to the display unit 2011. This is described below by way of the following example. Assume that multiple pieces of associated information are acquired by image search performed based on the single captured image 40 transmitted from the terminal apparatus 20 to the image search system 200A. Meanwhile, multiple pieces of associated information can be assigned to a single object as indicated by the parts 143₁ and 143₂ in FIG. 5.

The presenting unit 2208 is capable of extracting certain piece of associated information by applying, as a filter, a parameter accepted by the accepting unit 2205 to multiple pieces of associated information. More specifically, the parameter may be configured to contain a part of or the entire of a single piece of associated information, for example. The presenting unit 2208 compares the acquired multiple pieces of associated information against the parameter, thereby extracting associated information conforming to the parameter.

When the presenting unit 2208 has extracted the single piece of associated information from the multiple pieces of associated information, the presenting unit 2208 can generate and configure presenting information so as to highlight the extracted single piece of associated information. The display unit 2011 generates, based on the presenting information, display information configured so as to highlight the extracted single piece of associated information compared to the other multiple pieces of associated information. Any method, including boldfacing and color inversion, for highlighting the displayed information can be used. Alternatively, when the presenting unit 2208 has extracted a single piece of associated information from multiple pieces of associated information, the presenting unit 2208 may generate and configure presenting information so as to display only the extracted single piece of associated information.

Figure 15:
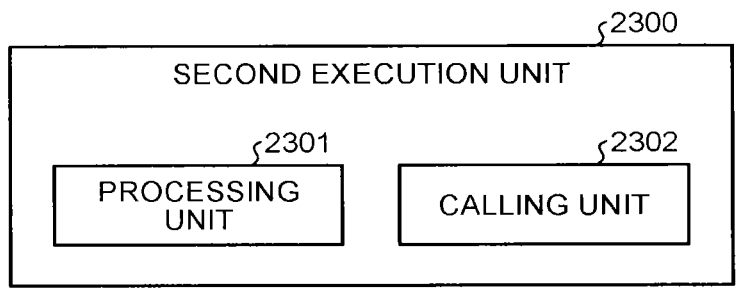
FIG. 15 is an exemplary functional block diagram for describing functions of the second execution unit according to the first embodiment.

FIG. 15 is an exemplary functional block diagram for describing functions of the second execution unit 2300 according to the first embodiment. Referring to FIG. 15, the second execution unit 2300 includes a processing unit 2301 and a calling unit 2302.

The processing unit 2301 performs a process specific to the second execution unit 2300. In an example scenario where the second execution unit 2300 is an application for carrying out promotional campaign of a singer, the processing unit 2301 may process displaying the singer's personal profile, reproducing a music video of the singer, displaying event announcement, concert ticket selling, and/or the like. In another example scenario where the second execution unit 2300 is an application for advertising a shop, the processing unit 2301 may process displaying navigation to the location of the shop and information about goods sold at the shop, online selling, and/or the like.

The calling unit 2302 calls the first execution unit 2200. For example, the calling unit 2302 launches the first execution unit 2200 by performing operations in Steps S10 to S13 of FIGS. 13A to 13C in response to user's manipulation or the like. The calling unit 2302 is provided in advance with a parameter which is to be passed to the first execution unit 2200 to be launched. The calling unit 2302 passes the parameter to the first execution unit 2200 when launching the first execution unit 2200. The parameter may be passed from the second execution unit 2300 to the first execution unit 2200 via the OS, for example.

First Example Application of First Embodiment

A first example application of the first embodiment is described below. The first example application is configured as described below so that specific content can be acquired by performing, by the first execution unit 2200 called by the second execution unit 2300, image search based on an image designated by the second execution unit 2300 as the captured image 40.

Figure 16:
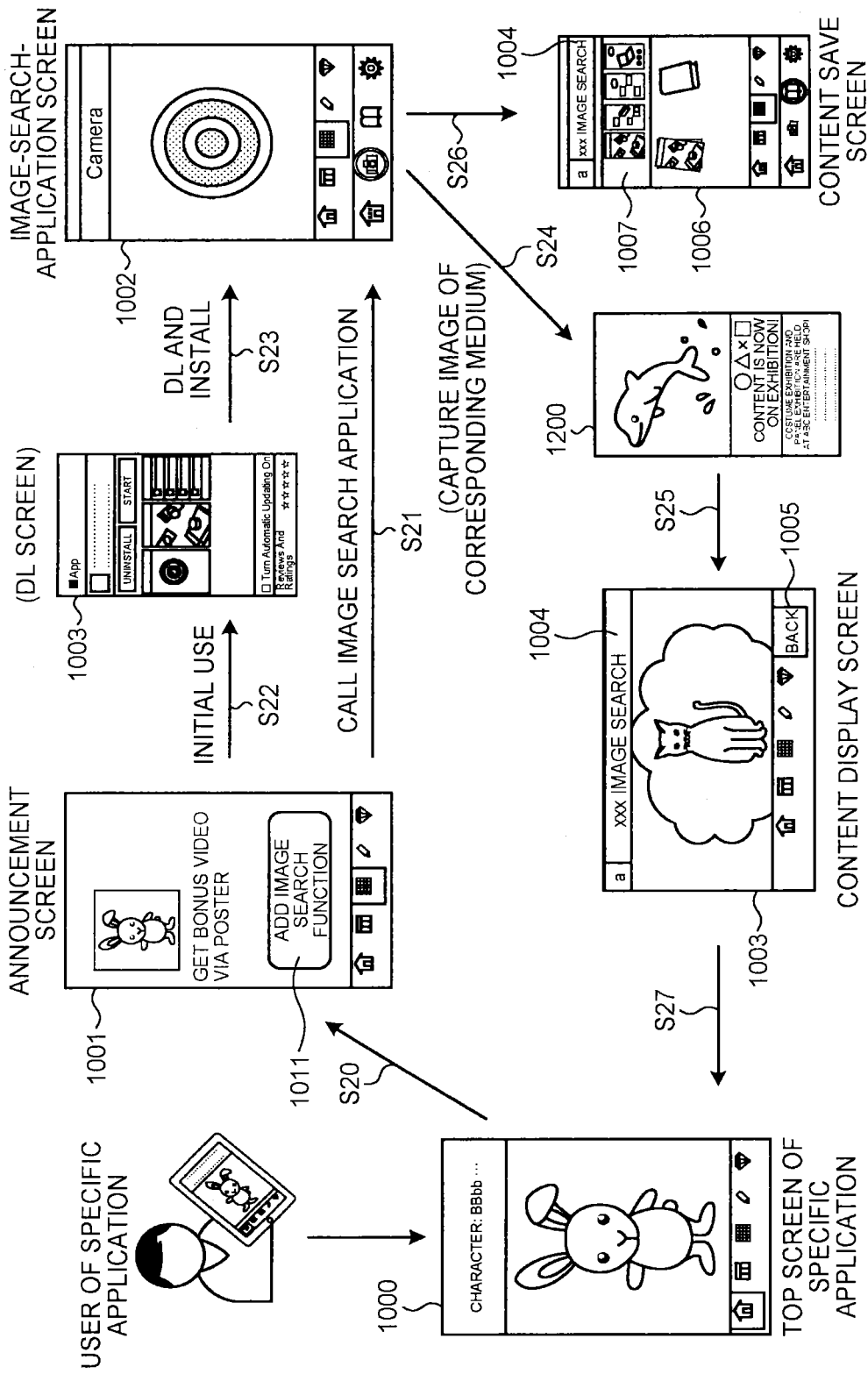
FIG. 16 is a diagram schematically illustrating a processing procedure according to a first example application of the first embodiment.

FIG. 16 schematically illustrates a procedure for processing according to the first example application of the first embodiment. In this example, the specific application, which is the second execution unit 2300, is assumed as a specific application for carrying out promotional campaign or announcement. However, examples of the specific application applicable to the first example application are not limited thereto. When the specific application is launched on the terminal apparatus 20, a top screen 1000 of the specific application appears on the display device 406 of the terminal apparatus 20. In this example, button images respectively corresponding to functions provided by the specific application are displayed on a lower portion of the top screen 1000. A user can cause a desired one of the functions provided by the specific application to be performed by touching a position of the button image corresponding to the function with a finger or the like.

It is assumed that, at this point in time, the image search application 220, which is the first execution unit 2200, is not launched yet on the terminal apparatus 20. Hereinafter, the button images are simply referred to as the "buttons"; touching a position of a button image is referred to as "operating the button".

When a predetermined button on the top screen 1000 is operated, the specific application changes the display on the display device 106 to an announcement screen 1001 (Step S20). In this example, the specific application is configured such that when a user performs image search based on the captured image 40 acquired by image capture of a designated subject, e.g., a poster 1200, using the image search system 200A, the user can obtain a URL of a web site providing a privilege video, for example. In this example, it is assumed that the content distribution web site 210A illustrated in FIG. 9 distributes the privilege video.

A button 1011 for adding the image search function is arranged on the announcement screen 1001. When this button 1011 is operated, the specific application calls the image search application 220. At this time, the terminal apparatus 20 determines whether or not the image search application 220 is installed. More specifically, for example, the specific application requests the OS to launch the image search application 220 as illustrated in Step S10 of FIG. 13A. In response to this request, the OS determines whether or not the image search application 220 is installed in Step S11.

If the terminal apparatus 20 determines that the image search application 220 is installed, the specific application calls and launches the image search application 220 (Step S21). At this time, the specific application passes a predetermined parameter to the image search application 220 being launched. This parameter contains information, such as a name of the specific application, indicating the specific application and information indicating the server name of the image search server 11 and the DB name of the DB 12 for use in image search to be performed based on the captured image 40 acquired by image capture of the poster 1200. The server name and the DB name contained in the parameter are a predetermined server name and a predetermined DB name which depend on the specific application.

This parameter may further contain information for configuring skin of an execution screen (e.g., an image-search-application screen 1002) which appears when the image search application 220 is launched and information for configuring UI of the image search application 220.

On the other hand, if the terminal apparatus 20 determines that the image search application 220 is not installed yet as in the case of initial use of the image search application 220, it is necessary for the terminal apparatus 20 to externally acquire a program for installing the image search application 220 over the network or the like. Accordingly, in Step S22, the specific application changes the display on the display device 406 of the terminal apparatus 20 to a download (DL) screen 1003 for downloading the program over the network.

The terminal apparatus 20 starts downloading and installation of the program in response to predetermined user's manipulation of the DL screen 1003 (Step S23). More specifically, as illustrated in FIG. 13C, the OS may control the communication I/F 410 to externally acquire the program over the network (Step S13), and install the program into the terminal apparatus 20.

When the program has been installed, the installed program is automatically run to launch the image search application 220. When launched, the image search application 220 changes the display on the display device 406 to the image-search-application screen 1002.

When, in the terminal apparatus 20 where the image search application 220 is launched, a predetermined button arranged on the image-search-application screen 1002 is operated to capture an image of a subject which is the designated poster 1200, an image of the poster 1200 is acquired as the captured image 40 (Step S24). The image search application 220 transmits the captured image 40 acquired by image capture of the poster 1200 to the image search system 200A. More specifically, the image search application 220 transmits the captured image 40, to which the server name and the DB name contained in the parameter passed from the specific application are appended, to the image search system 200A.

The image search system 200A selects one of the image search servers 11 and one of the DBs 12 in accordance with the server name and the DB name appended to the captured image 40 and performs image search based on the captured image 40. The image search system 200A acquires a single piece of associated information indicating a web site for the privilege video, for example, as a search result, and transmits the search result to the terminal apparatus 20 (Step S25). The associated information is received by the image search application 220 of the terminal apparatus 20.

The image search application 220 accesses the content distribution web site 210A in accordance with the received associated information and acquires the privilege video as content. The image search application 220 changes the display on the display device 406 to a content display screen 1003 and causes the acquired privilege video to be displayed. At this time, it is preferable that the image search application 220 causes information 1004 indicating the calling source specific application to be displayed on the content display screen 1003.

The image search application 220 can save the content (privilege image) acquired in Step S25 using the saving unit 2207 (Step S26). The saving unit 2207 may associate the content with information indicating the calling source or information indicating the content distribution web site 210A, from which the privilege video is acquired, and save the content associated with the information in the storage 407, for example.

The image search application 220 changes the display on the display device 406 to a content save screen 1006 when a predetermined operation requesting to save the content is performed on the content display screen 1003 or on the image-search-application screen 1002 after acquisition of the captured image 40. When a predetermination operation is performed on the content save screen 1006 to confirm the content saving, the image search application 220 saves the acquired content using the saving unit 2207. The saved content is displayed in a collection display area 1007 in the form of, for example, a list.

The user can return to the specific application, which is the calling source, by operating a BACK button 1005 on the content display screen 1003. More specifically, when the BACK button 1005 is operated, the calling unit 2206 calls the specific application, which is the calling source (Step S27). Calling operations performed at this time to call the specific application are substantially the same as the above-described operations performed in Steps S10 to S12 of FIGS. 13A and 13B.

As indicated in the first example application, the image search application 220 according to the first embodiment is capable of acquiring specific content which depends on a parameter passed from a specific application at launch of the image search application 220 by performing image search based on the captured image 40. This facilitates, for a provider of the specific application, extending function of the specific application or, more specifically, adding the function provided by the image search application 220 to the specific application.

Second Example Application of First Embodiment

Second Example Application of First Embodiment

A second example application of the first embodiment is described below. In the second example application, the first execution unit 2200 called by the second execution unit 2300 selects associated information from pieces of associated information acquired by image search performed based on the captured image 40 according to a parameter passed from the second execution unit 2300.

Figure 17:
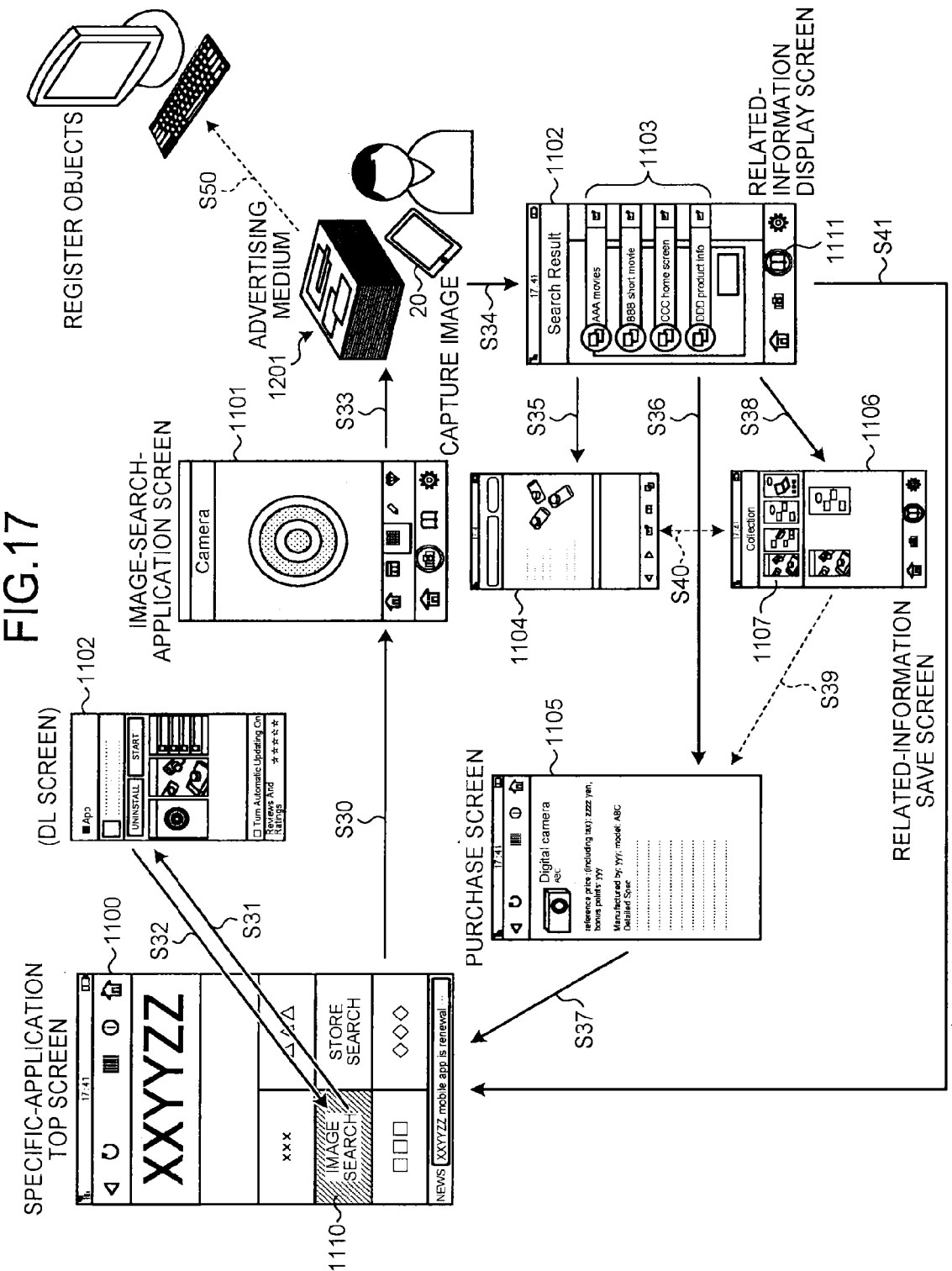
FIG. 17 is a diagram schematically illustrating a processing procedure according to a second example application of the first embodiment.

FIG. 17 schematically illustrates a procedure for processing according to the second example application of the first embodiment. In this example, the specific application, which is the second execution unit 2300, is assumed as a specific application provided by a retailer to advertise the retailer's store and selling commercial goods online (i.e., conducting electronic commerce). However, examples of the specific application applicable to the second example application are not limited thereto. When the specific application is launched on the terminal apparatus 20, a specific-application top screen 1100 appears on the display device 406 of the terminal apparatus 20. In this example, "XXYYZZ", the name of the store, is displaced on a top portion of the top screen 1100. Buttons for causing the specific application to perform various types of functions are displayed below the store name. A button 1110, which is one of the buttons, is a button for adding the image search function.

It is assumed that, at this point in time, the image search application 220, which is the first execution unit, is not launched on the terminal apparatus 20 yet.

When the button 1110 on the top screen 1100 is operated, the specific application calls the image search application 220. At this time, the terminal apparatus 20 determines whether or not the image search application 220 is installed. If the terminal apparatus 20 determines that the image search application 220 is installed, the specific application calls and launches the image search application 220 (Step S30). When launched, the image search application 220 changes the display on the display device 406 to an image-search-application screen 1101.

When calling the image search application 220, the specific application passes a predetermined parameter to the image search application 220. This parameter contains information, such as a name of the specific application, indicating the specific application and information indicating the server name of the image search server 11 and the DB name of the DB 12 for use in image search to be performed based on the captured image 40 acquired by image capture. The server name and the DB name contained in the parameter are a default server name and a default DB of the image search system 200A.

This parameter may further contain information for configuring skin of an execution screen (e.g., the image-search-application screen 1101) which appears when the image search application 220 is launched and information for configuring UI of the image search application 220.

If the terminal apparatus 20 determines that the image search application 220 is not installed, in Step S31, the specific application changes the display on the display device 406 to a DL screen 1102 for downloading the program for installing the image search application 220 over the network.

The specific application starts downloading and installation of the program in response to predetermined user's manipulation of the DL screen 1102 (Step S32). When the program has been installed, the installed program is automatically run to launch the image search application 220 (Step S30). When launched, the image search application 220 changes the display on the display device 406 to the image-search-application screen 1101.

In the second example application, a subject, the image of which is captured for image search by the terminal apparatus 20 where the image search application 220 is launched, is an advertising medium 1201 of a good sold by the retailer which is the provider of the specific application. Producer of the advertising medium 1201 pre-registers objects, including an image of the good contained in the advertising medium 1201, in the image search system 200A (Step S50).

In the case of the second example application, it is highly possible that the producer of the advertising medium 1201 is manufacturer of the good advertised by the advertising medium 1201 and not directly related to the retailer or, in other words, the provider of the specific application. Put another way, it is highly possible that goods of the same model are sold by multiple retailers, and the same advertising medium 1201 advertising the good of the model is used by the multiple retailers.

The following situation can occur during registration of the object contained in the advertising medium 1201 in the image search system 200A. That is, multiple pieces of associated information, which indicate the respective multiple retailers selling the goods of the model advertised by the advertising medium 1201, can be associated with the object. For example, multiple pieces of associated information, which indicate respective retailers A, B, and C selling goods of a single (the same) model, can be registered associated with an object, which is an image of the good, in the image search system 200A.

Each of the retailers A, B, and C can register the object, which is the image of the good of the single model, associated with multiple pieces of associated information. A possible scenario is that the object, which is the image of the good of the single model, is registered associated with a piece of associated information for displaying details of the good and with a piece of associated information for allowing purchase of the good online.

When, in the terminal apparatus 20, a predetermined button arranged on the image-search-application screen 1101 is operated to capture an image of the subject (the advertising medium 1201), the image of the advertising medium 1201 is acquired as the captured image 40 (Step S33). The image search application 220 transmits the captured image 40 acquired by image capture of the advertising medium 1201 to the image search system 200A. More specifically, the image search application 220 transmits the captured image 40, to which the server name and the DB name contained in the parameter passed from the specific application are appended, to the image search system 200A.

In the second example application, appending a DB name and a server name to the captured image 40 in this manner can be omitted. In the case where a DB name and a server name are not appended to the captured image 40 transmitted from the terminal apparatus 20, the image search system 200A performs image search using the system-default image search server 11 and the system-default DB 12.

The image search system 200A selects one of the image search servers 11 and one of the DBs 12 in accordance with the server name and the DB name appended to the captured image 40 and performs image search based on the captured image 40. In this scenario, because the server name and the DB name are their default values, the image search system 200A selects the system-default image search server 11 and the system-default DB 12. Meanwhile, the image search system 200A selects the system-default image search server 11 and the system-default DB 12 also in the case where appending the server name and the DB name to the captured image 40 is omitted.

The image search system 200A performs image search based on the captured image 40 acquired by image capture of the advertising medium 1201. The image search system 200A then acquires associated information associated with the object contained in the advertising medium 1201. In this scenario, as described above, the three pieces of associated information, which indicate the respective retailers A, B, and C, are associated with the object. The image search system 200A acquires the three pieces of associated information as a result of the image search.

The image search system 200A transmits the three pieces of associated information acquired as the search result to the terminal apparatus 20 (Step S34). The three pieces of associated information are received by the image search application 220 of the terminal apparatus 20.

Upon receiving the pieces of associated information, the image search application 220 extracts associated information related to the specific application, which is the calling source of the image search application 220, from the pieces of received associated information.

This will be described more specifically below. Information indicating the specific application is contained in the parameter to be passed from the specific application to the image search application 220. This information is configured in advance so as to contain a part of the associated information related to the specific application. More specifically, for example, in a case where the associated information is a URL, the parameter may contain domain name of the URL as the information indicating the specific application. In this case, the image search application 220 compares each of the pieces of received associated information (URLs) against the information which is contained in the parameter and indicates the specific application, thereby extracting associated information, which contains a domain name matching the domain name of the information which is contained in the parameter and indicates the specific application, as the associated information related to the specific application. If the received associated information contains multiple pieces of associated information which are identical in domain name but differ from each other in path name, these multiple pieces of associated information can be extracted.

Applying filtering to multiple pieces of associated information using a parameter in this manner allows extracting associated information related to the specific application, which is the calling source of the image search application 220.

The image search application 220 generates a related-information display screen 1102 based on the associated information extracted (filtered) using the parameter and causes the display device 406 to display the related-information display screen 1102. The related-information display screen 1102 contains an area 1103 where buttons for choosing from pieces of related information related to the object contained in the advertising medium 1201 are arranged. A user can operate one button, with which desired related information is chosen, of the buttons arranged in the area 1103 to thereby change the display on the display device 406 to a screen displaying the chosen related information.

For instance, assume that multiple buttons are arranged in the area 1103. A first button of the multiple buttons is to designate a URL where detailed information about the good indicated by the object contained in the advertising medium 1201 is presented, for example. When the first button is operated, the image search application 220 accesses the URL and changes the display on the display device 406 to a content display screen 1104 which displays the detailed information about the good at the URL (Step S35).

In the example illustrated in FIG. 17, the image search application 220 accesses the URL by launching the browser application, which is default-installed in the terminal apparatus 20, and passing the URL to the browser application as a parameter. In this case, the screen provided by the browser application corresponds to the content display screen 1104. Alternatively, the image search application 220 may display the content display screen 1104 by using an internal function of the image search application 220.

A second button is to designate, for example, a URL where the good can be purchased online. When the second button is operated, the image search application 220 accesses the URL and changes the display on the display device 406 to a purchase screen 1105 at the URL (Step S36). In this example, the purchase screen 1105 is configured to allow moving from the purchase screen 1105 to the specific-application top screen 1100 (Step S37).

When a third button is operated, related information is saved in the terminal apparatus 20, for example (Step S38). The image search application 220 can designate, for example, a URL (associated information) displayed on the related-information display screen 1102 and save the designated URL using the saving unit 2207. At this time, the image search application 220 can acquire a page at the designated URL as an image, for example, and display the acquired image associated with the URL in a collection display area 1107 in a form of a thumbnail image. Images and URLs hitherto been saved by the image search application 220 are displayed in the collection display area 1107 in a list form.

A user can access a URL associated with a desired one of the thumbnail images by choosing and operating the one thumbnail image in the collection display area 1107. If the chosen thumbnail image is associated with the URL where, for example, the detailed information about the good is provided, the image search application 220 changes the display on the display device 406 to the content display screen 1104 (Step S40). Similarly, if the chosen thumbnail image is associated with the URL where the good can be purchased, the image search application 220 changes the display on the display device 406 to the purchase screen 1105 (Step S39).

When a BACK button 1111 on the related-information display screen 1102 is operated, the specific application is called by the image search application 220, and execution priority is taken from the image search application 220 and given to the specific application. The display on the display device 406 is changed to the specific-application top screen 1100 (Step S41).

As indicated in the second example application, the image search application 220 according to the first embodiment can extract associated information which depends on a parameter passed from a specific application at launch of the image search application 220 from multiple pieces of associated information acquired as a result of image search based on the captured image 40. Because the specific application operates only to pass the parameter from the specific application to the image search application 220, extending functionality for implementing the second example application can be attained easily.

Second Embodiment

Figure 18:
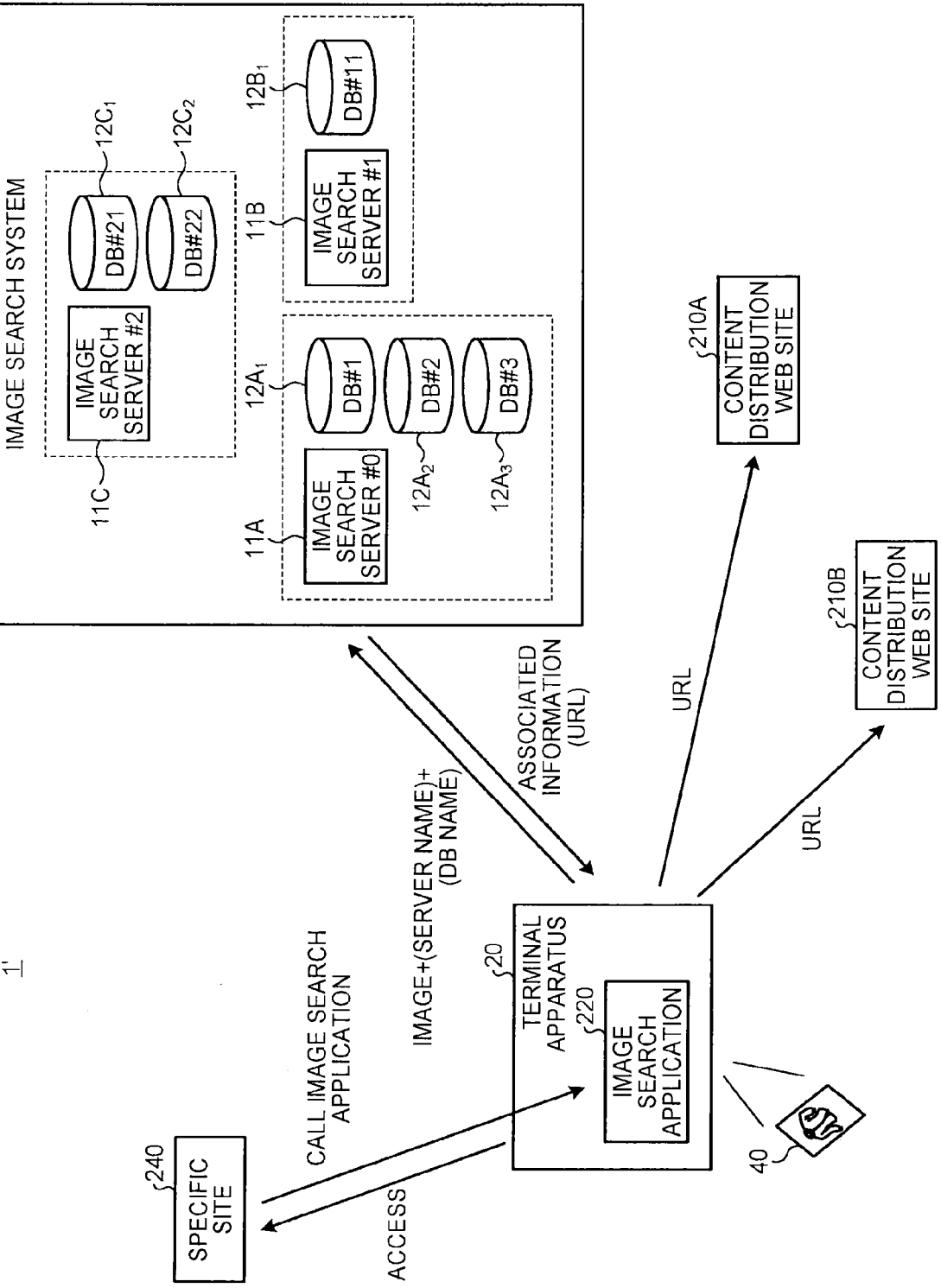
FIG. 18 is a diagram illustrating an example configuration of an information processing system according to a second embodiment.

A second embodiment of the present invention is described below. FIG. 18 illustrates an example configuration of an information processing system according to the second embodiment. Repeat use of reference characters in FIGS. 9 and 18 is intended to represent the same or analogous features or elements, and repeated detailed description is omitted.

As illustrated in FIG. 18, an information processing system 1' according to the second embodiment includes, on a network, a specific web site 240 (hereinafter, the "specific site 240") capable of implementing functions equivalent to those provided by the specific application of the first embodiment. In the information processing system 1', the terminal apparatus 20 accesses the specific site 240. The specific site 240 calls the image search application 220 on the terminal apparatus 20 and passes a parameter to the launched image search application 220. The parameter includes at least a URL of the specific site 240 as information indicating the calling source specific site 240.

The image search application 220, to which the parameter is passed, operates as in the first embodiment described above, and repeated detailed description is omitted.

Figure 19:
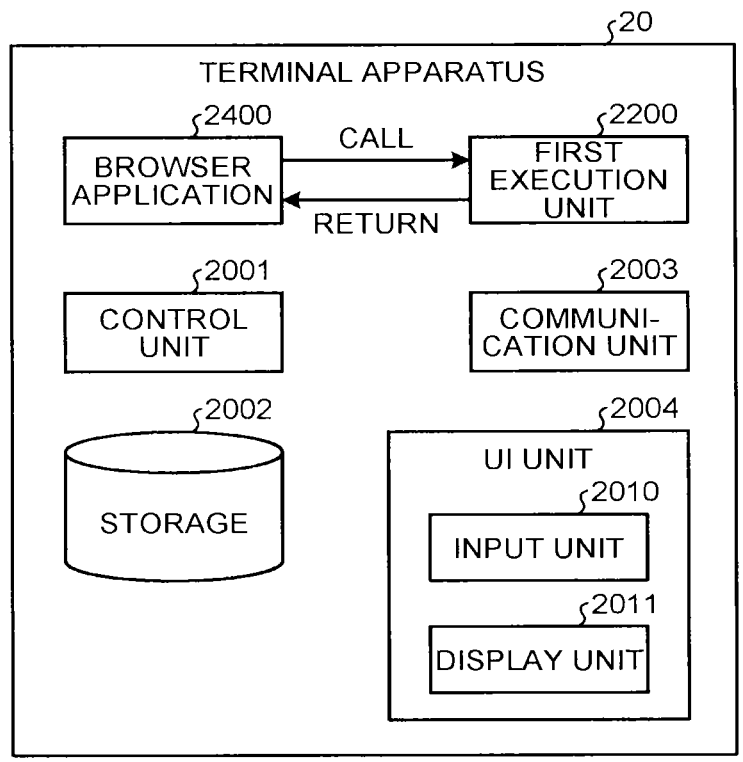
FIG. 19 is an exemplary functional block diagram for describing functions of the terminal apparatus according to the second embodiment.

FIG. 19 is an exemplary functional block diagram for describing functions of the terminal apparatus 20 according to the second embodiment. Repeat use of reference characters in FIGS. 11 and 19 is intended to represent the same or analogous features or elements, and repeated detailed description is omitted. As illustrated in FIG. 19, the terminal apparatus 20 does not include the second execution unit 2300;

instead, the terminal apparatus 20 calls the first execution unit 2200 using a browser application 2400.

Figure 20:
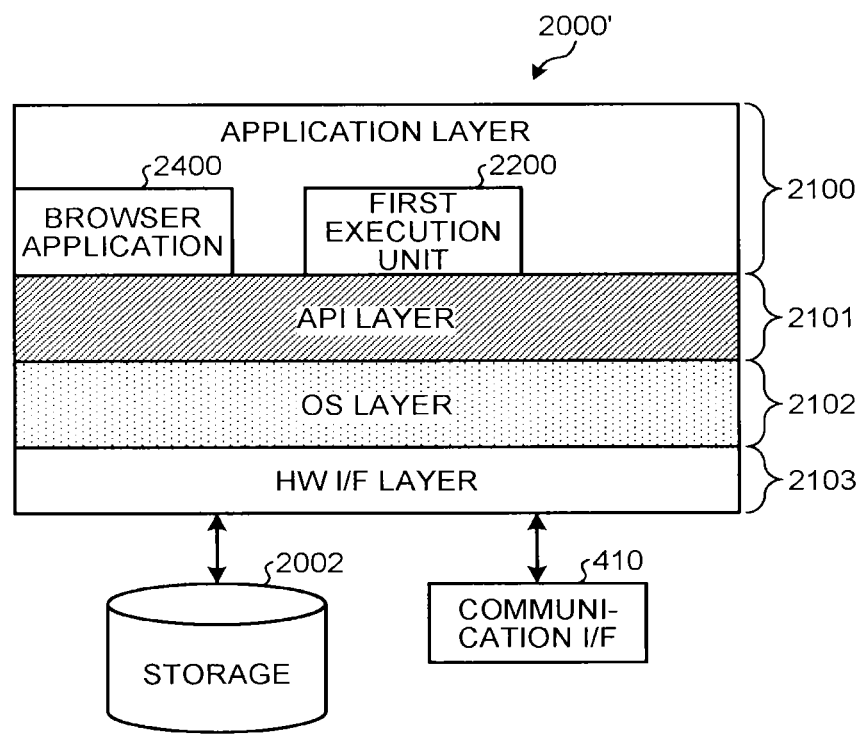
FIG. 20 is a diagram schematically illustrating operations according to the second embodiment for launching the first execution unit via a browser application.

Operations for launching the first execution unit 2200 (the image search application 220) through the browser application 2400 are schematically described below with reference to FIGS. 20 to 22. FIG. 20 schematically illustrates an example configuration of a terminal program running on the terminal apparatus 20 according to the second embodiment. Repeat use of reference characters in FIGS. 12 and 20 is intended to represent the same or analogous features or elements, and repeated detailed description is omitted.

Referring to FIG. 20, a terminal program 2000' includes the application layer 2100, the API layer 2101, the OS layer 2102, and the hardware I/F layer 2103. The application layer 2100 includes the browser application 2400 and the first execution unit 2200.

Figure 21A:
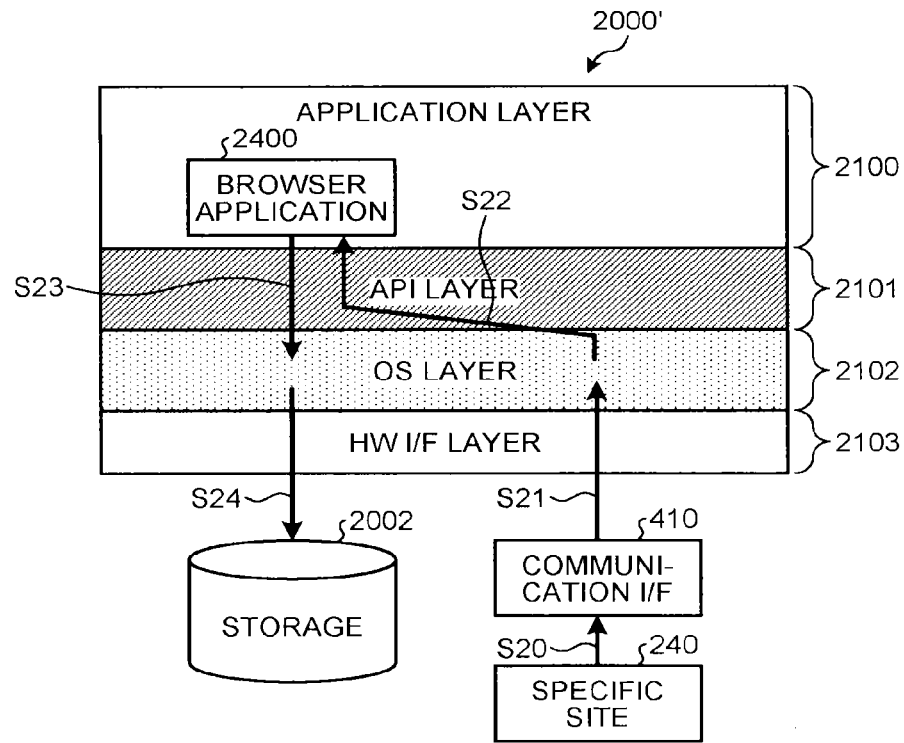
FIGS. 21A and 21B are diagrams schematically illustrating operations according to the second embodiment for launching the first execution unit via the browser application.
Figure 21B:
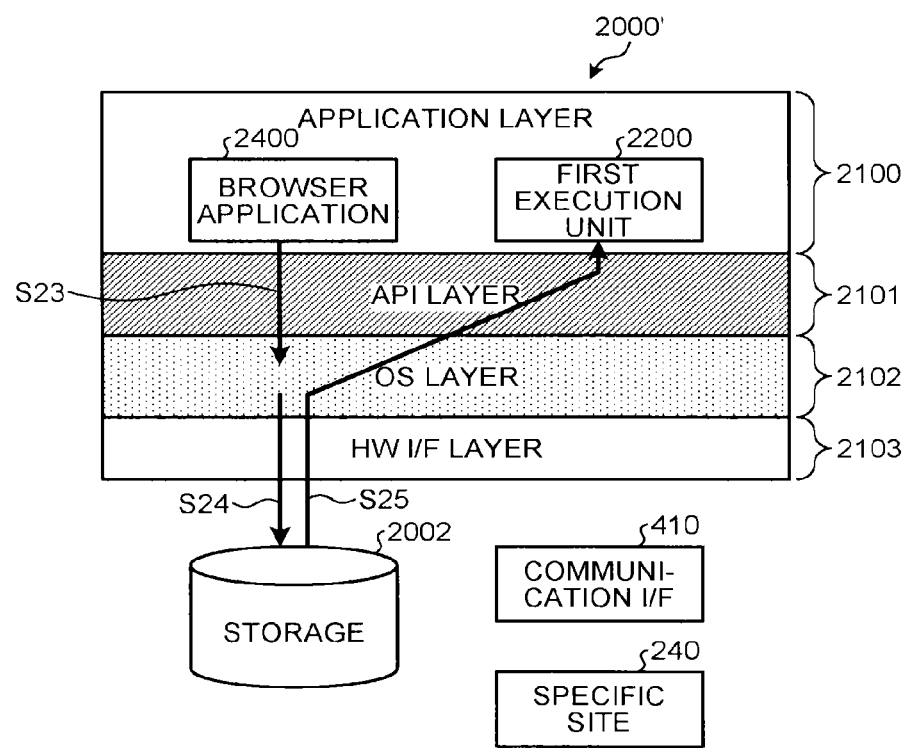

FIGS. 21A and 21B schematically illustrate a procedure of operations performed by the browser application 2400 to import data provided at the specific site 240 into the browser application 2400 and call the first execution unit 2200 according to the second embodiment. FIGS. 21A and 21B illustrate an example of operations in a scenario where the first-execution-unit program for executing the first execution unit 2200 has already been installed in the terminal apparatus 20.

The browser application 2400 accesses the specific site 240 at a given URL via the communication I/F 410. Through this access, data provided on the page at the URL is transmitted to the communication I/F 410 over the network (Step S20). This data is passed from the communication I/F 410 to the OS via the hardware I/F layer 2103 (Step S21). The data is then passed from the OS to the browser application 2400 via the API layer 2101 (Step S22).

When the data provided at the specific site 240 is loaded into the browser application 2400, a screen of the page of the specific site 240 is displayed on the browser application 2400. This screen contains a button or a hyperlink for calling the first execution unit 2200 and passing a parameter to the same.

As illustrated in FIG. 21A, when the button or the hyperlink is operated to issue a command to call the first execution unit 2200, the browser application 2400 requests the OS to launch the first execution unit 2200 (Step S23). In response to this request, the OS accesses the storage 2002, for example (Step S24). As illustrated in FIG. 21B, the OS reads out the first-execution-unit program from the storage 2002 and loads it into the RAM 404, which is the main storage device (Step S25), and launches the first execution unit 2200. The OS then takes application execution priority from the browser application 2400 and gives it to the first execution unit 2200, for example.

Figure 22:
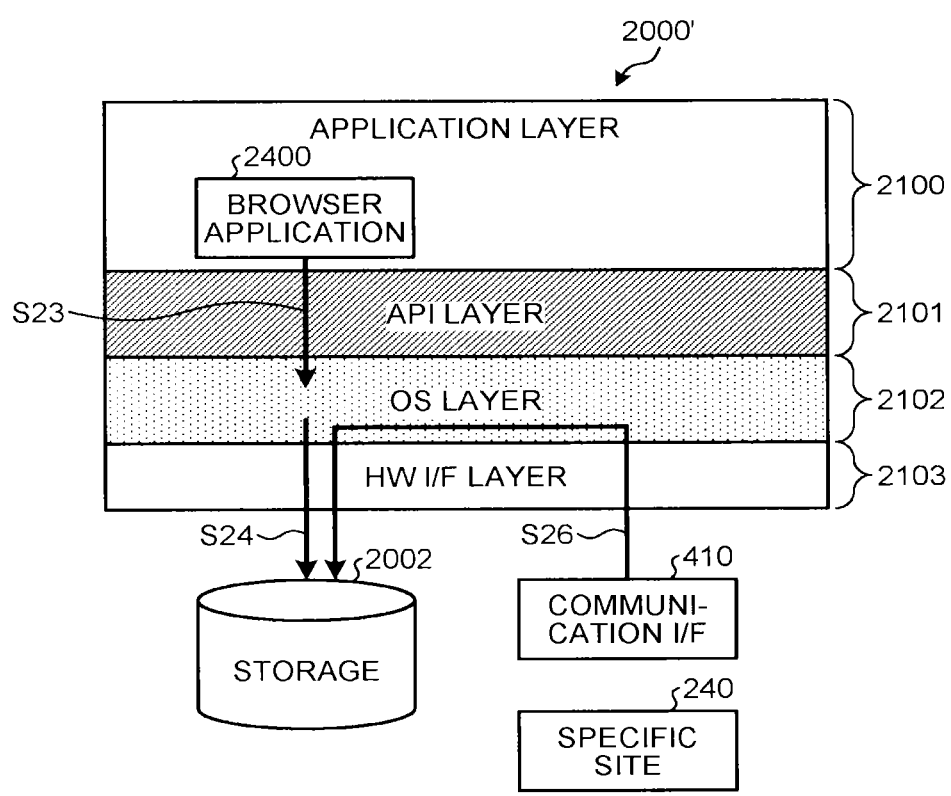
FIG. 22 is a diagram schematically illustrating operations according to the second embodiment for launching the first execution unit via the browser application.

FIG. 22 schematically illustrates a procedure of operations according to the second embodiment for calling, by the browser application 2400, the first execution unit 2200 by loading data from the specific site 240 in a situation where the first-execution-unit program for executing the first execution unit 2200 is not installed in the terminal apparatus 20. FIG. 22 is on an assumption that the operations of Steps S20 to S22 described above have already been performed and that the screen, which contains the button or the hyperlink for calling the first execution unit 2200 and passing a parameter to the same, of the page of the specific site 240 is displayed in the screen of the browser application 2400.

If the OS determines that, as a result of the access to the storage 2002 in Step S24, the first-execution-unit program has not been installed in the terminal apparatus 20 yet, the OS controls the communication I/F 410 to externally acquire the first-execution-unit program over the network (Step S26). The acquired first-execution-unit program is temporarily stored in the storage 2002 and installed according to a predetermined procedure. When the first-execution-unit program has been installed, the OS launches the first-execution-unit program by performing the operation of Step S25 described above.

More specifically, when launching the first execution unit 2200 through the browser application 2400, the browser application 2400 passes a parameter to the first execution unit 2200 based on the data loaded from the specific site 240. The parameter can include the URL of the specific site 240, for example, as information indicating the calling source of the first execution unit 2200. Using the URL of the specific site 240 as the information indicating the calling source causes the browser application 2400 to access the specific site 240 at the time of return from the first execution unit 2200. The parameter may include a server name and a DB name for use in image search.

When transmitting the captured image 40 to the image search system 200A, the first execution unit 2200, which is the image search application 220, appends information contained in the parameter passed from the browser application 2400 to the captured image 40 as in the first embodiment. The information allows the image search application 220 to acquire associated information related to the specific site 240 as a result of the image search. Furthermore, the associated information acquired by the image search application 220 can be passed to the browser application 2400, so that the browser application 2400 can access the content distribution web site 210A or the content distribution web site 210B related to the specific site 240.

As described above, according to the second embodiment, it is possible to launch the image search application 220 from a web site on the network using the terminal apparatus 20 and acquire associated information related to the web site by causing the image search system 200A to perform image search based on the captured image 40. In recent years, a web site dedicated to an event is often created on the Web, and proportion of event participants who obtain entry to the event through the web site is increasing. Applying the second embodiment allows, even when entry to the event is obtained through the web site, easy access to associated information related to the event.

In the examples described above, the parameter passed to the image search application 220 is the specific application or the specific site 240 on the network. However, the parameter is not limited to such examples. Alternatively, for example, the parameter may include position information. In this case, the terminal apparatus 20 may be configured to further include a GPS unit which provides location information by receiving a global positioning system (GPS) signal, and acquire information indicating an image-captured position of the captured image 40 using the GPS unit. The terminal apparatus 20 may pass the parameter, to which the position information is added, to the image search application 220. When the image search application 220 accesses a URL indicated by associated information acquired as a result of image search performed by the image search system 200A based on the captured image 40, the image search application 220 transmits the position information as a parameter of the URL. The position information allows a web site at the URL indicated by the associated information to transmit content which depends on the position information to the terminal apparatus 20.

In the above description, the parameter passed from the specific application to the image search application 220 is used in choosing one of the image search servers 11 and one of the DBs 12 for use in image search, selecting associated information from the pieces of associated information acquired as a result of the image search, and configuring the skin and the UI of the image search application 220. However, it is not limited to these examples.

For example, a startup screen of the image search application 220 may be configured depending on the parameter. For example, which one the image-search-application screen 1101 illustrated in FIG. 17 and a camera-capture-image screen, which directly displays an image captured with a camera, is to be displayed at launch of the image search application 220 may be determined depending on the parameter. In a case where the camera-capture-image screen is directly displayed, the screen may return to the specific-application top screen 1100 immediately when image capture is completed, for example.

An image-captured medium which is the subject to be image-captured to acquire the captured image 40 is not limited to a printed paper medium. The image-captured medium may be a medium, such as electronic paper or digital signage, for displaying an electronic image.

The parameter may place restriction on pieces of associated information to be acquired by image search. For example, the image search application 220 may limit the type of the associated information to be acquired by image search depending on the parameter. The parameter may further determine a language mode to be applied to the image search application 220. More specifically, although the language mode is typically determined by the OS, the parameter may forcibly change the language mode.

An embodiment provides an advantageous effect that it is made possible to easily configure a function, which is provided by an application and utilized from a further application, depending on the purpose of the further application.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal apparatus for communicating with an image search system, comprising:
 a processor configured to perform functions of an image search application, including:
  launching the image search application on the terminal apparatus by a calling application;
  receiving a parameter by the image search application, the parameter corresponding to the calling application;
  acquiring a captured image;
  transmitting a search request of the captured image which has been acquired;
 server receiving, from the image search system, associated information associated with an object contained in the image transmitted from the image search system based on the transmitted search request, the transmitted captured image being processed by the image search system which retrieves associated information associated with an object contained in the transmitted captured image, and
 presenting the associated information based on the parameter.

2. The terminal apparatus according to claim 1, wherein the processor is further configured to perform functions of the calling application including:
 a predetermined function; and
 calling the image search application while passing the parameter to the image search application.

3. The terminal apparatus according to claim 1, wherein:
 the image search application is called by another application executed by a computer connected to a network, said another application performing a predetermined function, and the parameter is passed to the image search application via the network when the image search application is called by the another application.

4. The terminal apparatus according to claim 1, wherein:
 the image search system includes one or more image search servers and a plurality of databases, one of the databases being allocated to a user, and
 the transmitting of the search request includes the transmitting of the parameter along with the captured image, the parameter further containing information specifying the database which is allocated to a provider of the calling application.

5. The terminal apparatus according to claim 1, further comprising:
 a display,
 wherein the image search application generates a screen to be displayed on the display depending on the parameter.

6. The terminal apparatus according to claim 1, further comprising:
 a display to display an executing screen which depends on the parameter; and
 a user interface that outputs a control signal depending on a touched position on the user interface,
 wherein the processor causes the display to display an execution screen and associate a position on the execution screen with the control signal.

7. The terminal apparatus according to claim 1, wherein the processor is further configured to:

save content acquired based on the associated information which has been received in association with the parameter.

8. The terminal apparatus according to claim 3, wherein the processor is further configured to perform:
    calling said another application when a user requests to go back using a screen of the image search application.

9. The terminal apparatus according to claim 3, wherein the image search application further includes:
    calling said another application when a user requests to go back using a screen of the image search application.

10. The terminal apparatus according to claim 1, wherein the transmitting transmits the captured image without transmitting the parameter to the image search system.

11. The terminal apparatus according to claim 1, wherein the presenting comprises:
    presenting the associated information using a plurality of separate applications.

12. A method of communicating with an image search system to perform functions of an image search application, comprising:
    launching the image search application on the terminal apparatus by a calling application;
    receiving a parameter by the image search application, the parameter corresponding to the calling application;
    acquiring a captured image;
    transmitting a search request of the captured image which has been acquired;
    receiving, from the image search system, associated information associated with an object contained in the image transmitted from the image search system based on the transmitted search request, the transmitted captured image being processed by the image search system which retrieves associated information associated with an object contained in the transmitted captured image, and
    presenting the associated information based on the parameter.

13. An information processing system, comprising:
a terminal apparatus; and
an image search system connected to the terminal apparatus using a network,
wherein the terminal apparatus comprises a processor configured to perform functions of an image search application, including:
    launching the image search application on the terminal apparatus by a calling application;
    receiving a parameter by the image search application, the parameter corresponding to the calling application;
    acquiring a captured image;
    transmitting a search request of the captured image which has been acquired;
    receiving, from the image search system, associated information associated with an object contained in the image transmitted from the image search system based on the transmitted search request, the transmitted captured image being processed by the image search system which retrieves associated information associated with an object contained in the transmitted captured image, and
    presenting the associated information based on the parameter,
wherein the image search system comprises a processor for:
registering an image corresponding to the captured image;
storing objects included in the image which has been registered and information associated with the image which has been captured;
receiving the search request of the captured image and the parameter which has been transmitted
retrieving information associated with an object contained in the captured image; and
transmitting the information associated with the object which has been retrieved to the terminal apparatus.

* * * * *